US010903633B2

(12) United States Patent
Brouwer et al.

(10) Patent No.: US 10,903,633 B2
(45) Date of Patent: Jan. 26, 2021

(54) INTERLOCKING CABLE CLEAT

(71) Applicant: Panduit Corp., Tinley Park, IL (US)

(72) Inventors: Shaun P. Brouwer, St. John, IN (US);
Surendra Chitti Babu, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 16/429,161

(22) Filed: Jun. 3, 2019

(65) Prior Publication Data

US 2019/0379188 A1 Dec. 12, 2019

Related U.S. Application Data

(60) Provisional application No. 62/681,986, filed on Jun. 7, 2018.

(51) Int. Cl.
*H02G 3/04* (2006.01)
*F16B 2/06* (2006.01)
*F16L 3/10* (2006.01)
*F16L 3/22* (2006.01)

(52) U.S. Cl.
CPC ........... *H02G 3/0456* (2013.01); *F16B 2/065* (2013.01); *F16L 3/1033* (2013.01); *H02G 3/0406* (2013.01); *F16L 3/222* (2013.01)

(58) Field of Classification Search
CPC ...... H02G 3/32; H02G 3/0456; H02G 3/0406; F16B 2/12; F16L 3/1033; F16L 3/1091
USPC ..................... 248/74.5, 74.4, 67.5
See application file for complete search history.

(56) References Cited

U.S. PATENT DOCUMENTS

| 544,501 | A | * | 8/1895 | Buffinton | H02G 7/08 248/67.5 |
| 631,234 | A | | 8/1899 | Stevens | |
| 3,022,972 | A | * | 2/1962 | Bunston | H02G 3/0608 248/68.1 |
| 4,776,808 | A | | 10/1988 | Davidson | |

(Continued)

FOREIGN PATENT DOCUMENTS

| CN | 102545129 A | 7/2012 |
| CN | 202474778 U | 10/2012 |

(Continued)

OTHER PUBLICATIONS

Ellis Patents, Ltd. one hole cable clamp installation instructions; 1 page; Aug. 23, 2011.

(Continued)

*Primary Examiner* — Bradley Duckworth
(74) *Attorney, Agent, or Firm* — Christopher S. Clancy; James H. Williams; Aimee E. McVady

(57) ABSTRACT

An interlocking cable cleat secures cables to a ladder rack. The interlocking cable cleat is formed from a first cable cleat half and a second cable cleat half. Each cable cleat half includes an outer surface, an inner surface, and at least one mounting hole extending from the outer surface to the inner surface. Semi-circular keys extend from the inner surface of each cable cleat half around the mounting holes in the cable cleat halves defining slots in the remainder of each mounting hole. Each slot receives one of the semi-circular keys from an opposing inverted cable cleat half to interlock the first cable cleat half to the second cable cleat half.

19 Claims, 46 Drawing Sheets

(56) References Cited

U.S. PATENT DOCUMENTS

| | | | |
|---|---|---|---|
| 5,794,897 A * | 8/1998 | Jobin | H02G 7/053 24/459 |
| 5,941,483 A | 8/1999 | Baginski | |
| 5,992,802 A * | 11/1999 | Campbell | H02G 3/30 248/68.1 |
| 6,471,171 B1 * | 10/2002 | VanderVelde | H02G 3/32 248/229.12 |
| 6,536,982 B2 | 3/2003 | Gibbons et al. | |
| 6,595,472 B1 | 7/2003 | Pisczak | |
| 6,772,929 B1 | 8/2004 | Stein | |
| 7,175,138 B2 * | 2/2007 | Low | H02G 3/263 24/455 |
| 7,179,010 B2 * | 2/2007 | Weger | F16L 3/243 403/289 |
| 8,398,033 B2 | 3/2013 | Booth | |
| 8,550,411 B2 * | 10/2013 | Hiss | F16L 3/1091 248/65 |
| 8,596,589 B2 * | 12/2013 | Hennon | F16L 3/222 248/65 |
| 8,757,560 B2 | 6/2014 | Darnell | |
| 9,000,299 B2 | 4/2015 | Ruth | |
| 9,400,066 B2 * | 7/2016 | Barre | F16L 3/1091 |
| 9,404,605 B2 | 8/2016 | Booth et al. | |
| 9,601,241 B2 | 3/2017 | Dannenberg | |
| 9,683,532 B2 * | 6/2017 | Rehwald | F16L 3/1075 |
| 10,094,491 B1 * | 10/2018 | Crounse | F16L 3/1008 |
| 10,411,452 B2 * | 9/2019 | Varale | H02G 3/32 |
| 2005/0141957 A1 * | 6/2005 | Chen | F16B 2/12 403/290 |
| 2006/0249636 A1 * | 11/2006 | Thiedig | F16L 3/237 248/74.4 |
| 2018/0216754 A1 * | 8/2018 | Ciasulli | F16L 3/1091 |
| 2019/0323632 A1 * | 10/2019 | Bechtold | H02G 3/32 |
| 2019/0379186 A1 | 12/2019 | Chitti Babu et al. | |
| 2020/0103052 A1 * | 4/2020 | Ohnemus | F16L 3/1016 |

FOREIGN PATENT DOCUMENTS

| | | |
|---|---|---|
| CN | 202616684 U | 12/2012 |
| CN | 202616728 U | 12/2012 |
| CN | 103368112 A | 10/2013 |
| CN | 204118600 U | 1/2015 |
| CN | 204664625 U | 9/2015 |
| CN | 106099408 A | 11/2016 |
| CN | 106151690 A | 11/2016 |
| CN | 107120478 A | 9/2017 |
| DE | 112012003735 T5 | 7/2014 |
| EM | 0003558540001 A1 | 8/2005 |
| EM | 0003558540002 A1 | 8/2005 |
| EM | 0003558540003 A1 | 8/2005 |
| EM | 0003558540004 A1 | 8/2005 |
| EM | 0007499990001 A1 | 7/2007 |
| EM | 0007499990002 A1 | 7/2007 |
| EM | 0007499990003 A1 | 7/2007 |
| EM | 0007499990004 A1 | 7/2007 |
| EM | 0007499990005 A1 | 7/2007 |
| EM | 0016687400001 A1 | 4/2010 |
| EM | 0016687400002 A1 | 4/2010 |
| EM | 0019275830001 A1 | 10/2011 |
| EM | 0028901110001 A1 | 12/2015 |
| EP | 2944854 A1 | 11/2015 |
| GB | 1217182 A | 12/1970 |
| GB | 1587532 A | 4/1981 |
| GB | 2324568 A | 10/1998 |
| GB | 2339237 B | 1/2000 |
| GB | 2361029 A | 10/2001 |
| GB | 2405900 A | 3/2005 |
| GB | 2405900 B | 7/2006 |
| GB | 4011835 D | 7/2009 |
| GB | 2486152 A | 6/2012 |
| GB | 2518562 A | 3/2015 |
| GB | 2514384 B | 12/2017 |
| JP | H0847151 A | 2/1996 |
| JP | H08219327 A | 8/1996 |
| JP | 2000341837 A | 12/2000 |
| JP | 2007020344 A | 1/2007 |
| JP | 2007259591 A | 10/2007 |
| JP | 2009189073 A | 8/2009 |
| KR | 20160059744 A | 5/2016 |
| WO | 2011039540 A1 | 4/2011 |
| WO | 2017046570 A1 | 3/2017 |

OTHER PUBLICATIONS

Ellis Patents; Ltd. two hole cableclamp (2F) data sheet, 2 pages; Aug. 30, 2011.
Ellis Patents, Ltd. collier 1F data sheet; 2 pages; Feb. 3, 2015.
Ellis Patents, Ltd. collier 1F one hold cable clamp installation instructions; 1 page; Feb. 3, 2015.
Ellis Patents, Ltd. collier 1A aluminium cable clamp installation instructions; 1 page; Feb. 3, 2015.
Bicon cable cleats aluminium trefoil cleat for cables 24mm-76mm; 3 pages; Jun. 14, 2017; retrieved from the Internet: URL:https://web.archive.orgiweb/20170614134128/https://www.cable-jointing.com/products/bicon-cable-cleats-aluminium-trefoil-cleat-cables-23mm-76mrn, retrieved on Jul. 11, 2019.

* cited by examiner

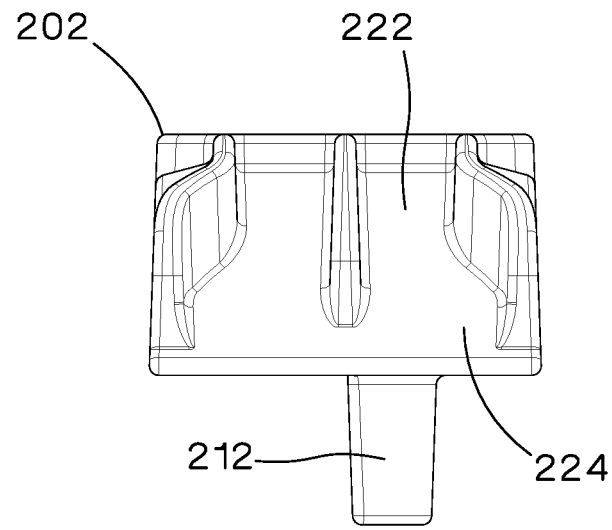
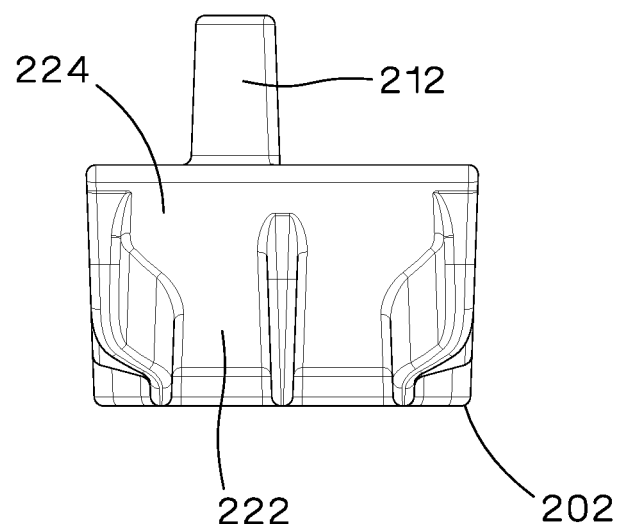
FIG.19

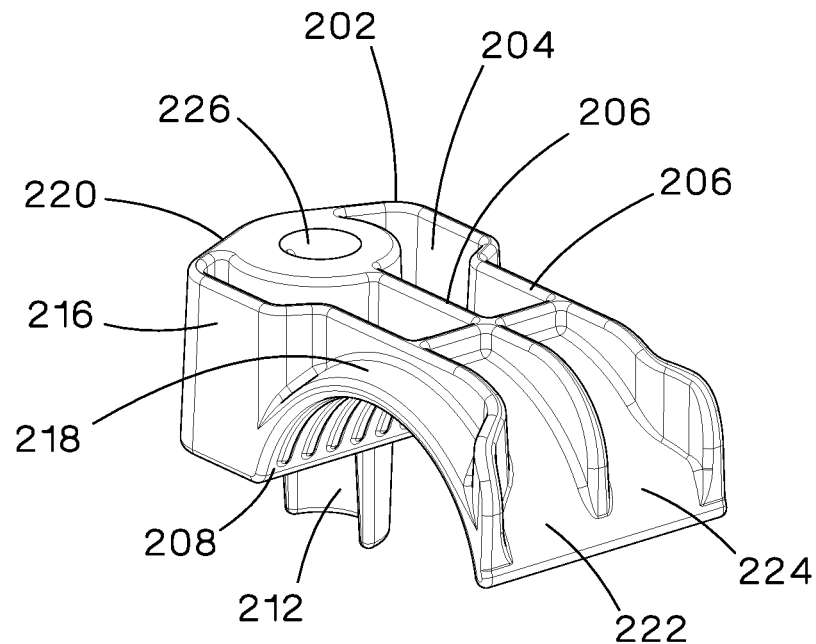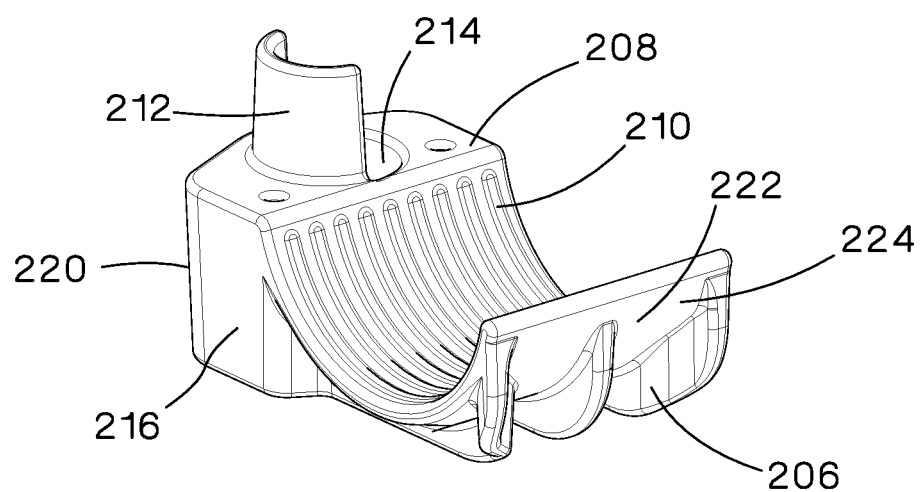
FIG.20

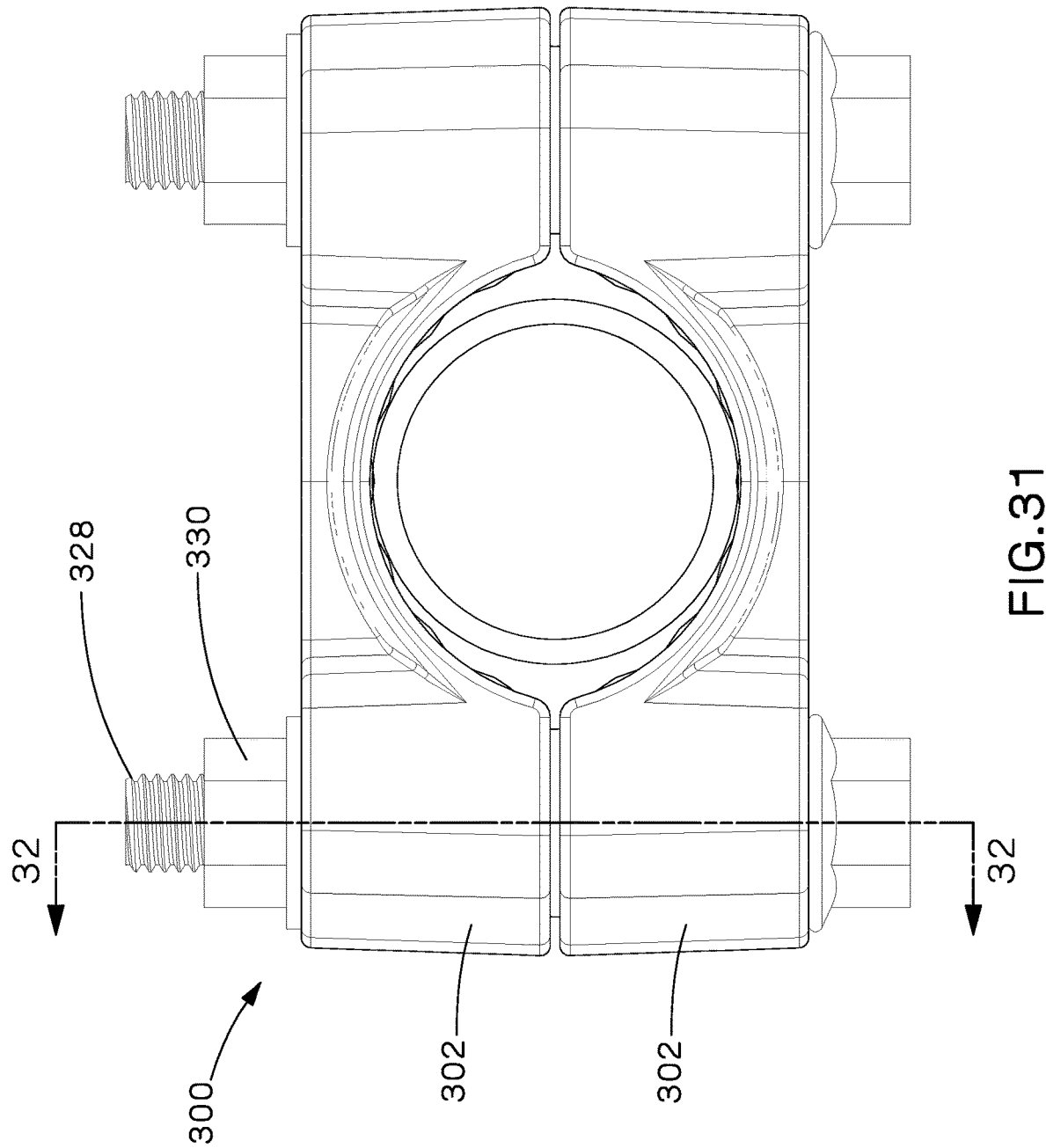

# INTERLOCKING CABLE CLEAT

CROSS REFERENCE TO RELATED APPLICATION

This application claims priority to U.S. Provisional Application No. 62/681,986, filed Jun. 7, 2018, the subject matter of which is hereby incorporated by reference in its entirety.

FIELD OF THE INVENTION

The present invention relates to a cable cleat for securing cables to a ladder rack, and more particularly to interlocking cable cleats for securing cables to a ladder rack.

BACKGROUND OF THE INVENTION

Cable cleats or cleat assemblies are typically used to manage and secure 3-phase power cables of various sizes along a cable ladder or ladder rung. In addition to securing cables laterally and axially, cable cleats must be rigid enough to retain cables during short-circuit events, where electromagnetic forces can cause the cables to repel one another at extremely high forces. Cable cleats hold the cables in place during a short-circuit event to prevent damage to people and property.

There is a need for an improved cable management assembly that can be used to manage and secure 3-phase power cables during a short-circuit event.

SUMMARY OF THE INVENTION

An interlocking cable cleat used to secure cables to a ladder rack. The interlocking cable cleat includes a first cable cleat half with an outer surface, an inner surface, and at least one mounting hole extending from the outer surface to the inner surface. The interlocking cable cleat also includes a second cable cleat half with an outer surface, an inner surface, and at least one mounting hole extending from the outer surface to the inner surface. Semi-circular keys extend from the inner surface of the first cable cleat half and the inner surface of the second cable cleat half. Each semi-circular key is positioned around the at least one mounting hole in the first cable cleat half and the at least one mounting hole in the second cable cleat half. The semi-circular keys define slots in the remainder of each mounting hole. Each slot receives one of the semi-circular keys from an opposing inverted cable cleat half to interlock the first cable cleat half to the second cable cleat half.

BRIEF DESCRIPTION OF THE DRAWINGS

FIG. 19 is a front exploded view of the one-hole interlocking cable cleat of FIG. 16.

FIG. 20 is an exploded perspective view of the one-hole interlocking cable cleat of FIG. 16.

FIG. 31 is a side view of the two-hole interlocking cable cleat assembly of FIG. 24 securing a small diameter cable.

DETAILED DESCRIPTION

Figure 1:
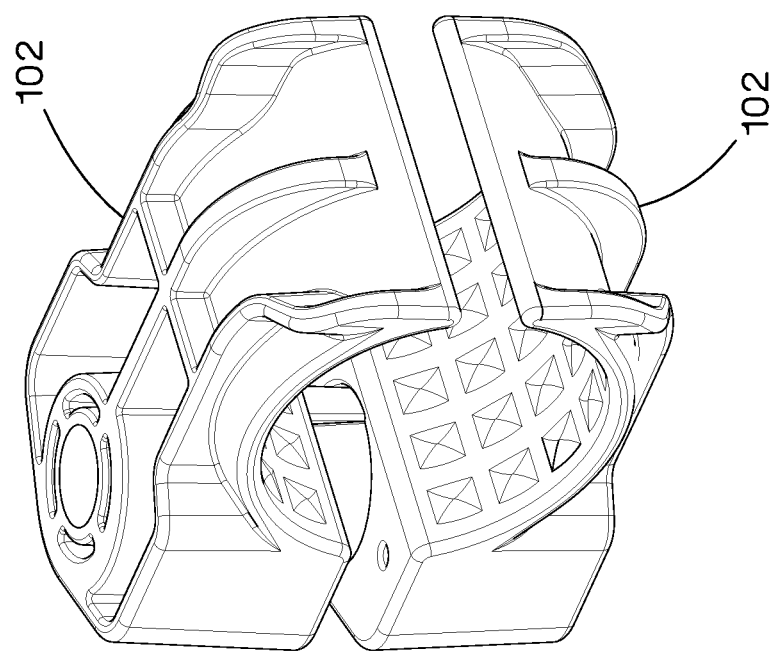
FIG. 1 is a perspective view of a one-hole interlocking cable cleat assembly of the present invention.

FIGS. 1-15 illustrates a one-hole interlocking cable cleat assembly 100 of the present invention. The one-hole interlocking cable cleat assembly 100 is designed to secure one cable 60 to a ladder rack 50.

The one-hole interlocking cable cleat assembly 100 includes two identical cable cleat halves 102. As illustrated in FIGS. 3-7, each cable cleat half 102 includes an outer surface 104, an inner surface 110, sides 118, a back 122 and a front 124. Each cable cleat half 102 also includes a mounting hole 128 extending from the outer surface 104 to the inner surface 110. The outer surface 104 includes a plurality of strengthening ribs 106 that extend a length of the cable cleat half 102. The outer surface 104 may also include a plurality of core out slots 108 surrounding the mounting hole 128. The core out slots 108 are for optimizing the molding or casting process of the cable cleat half 102.

Figure 8:
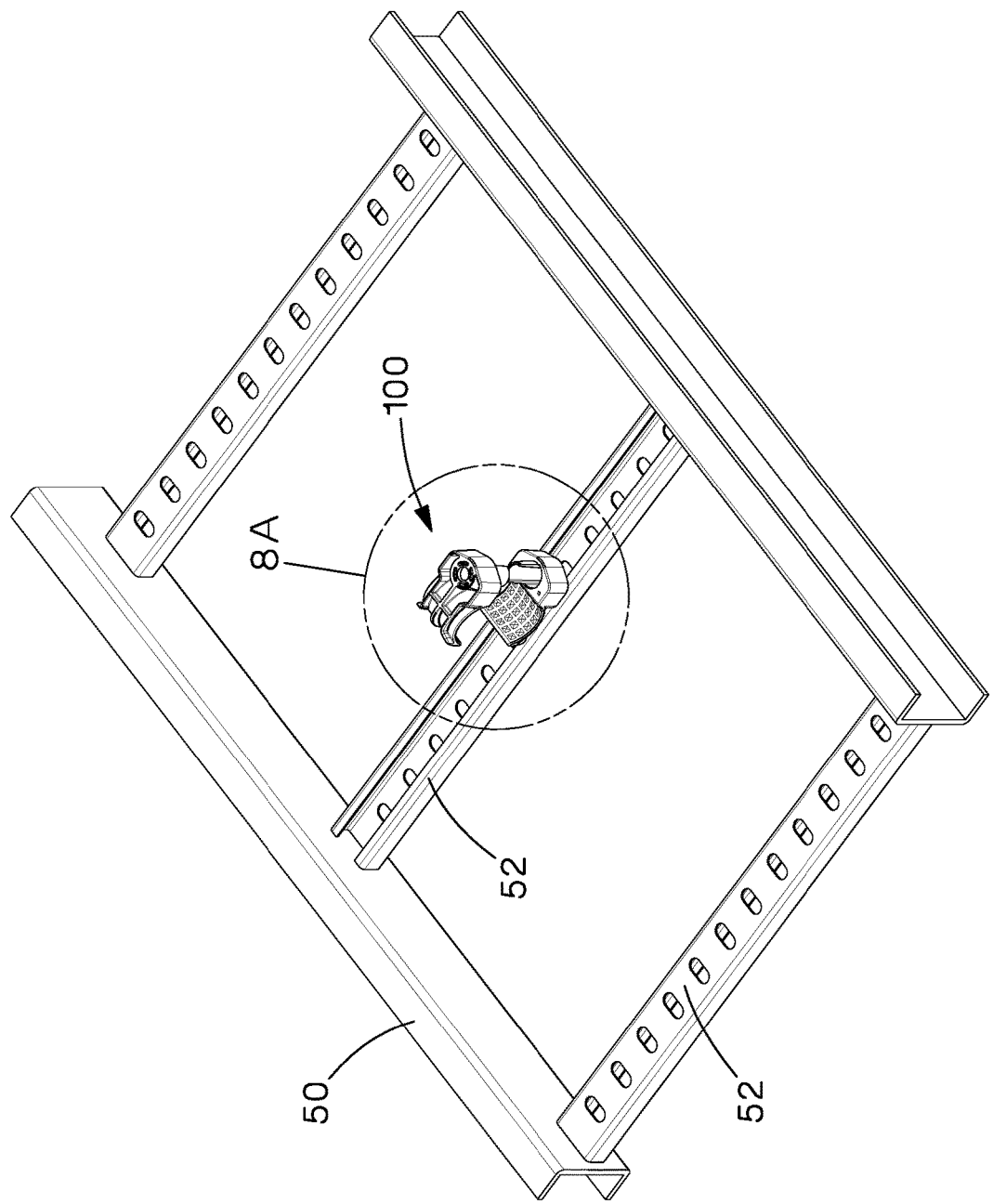
FIG. 8 is a perspective view of the one-hole interlocking cable cleat of FIG. 1 installed on an inverted ladder rung.
Figure 8A:
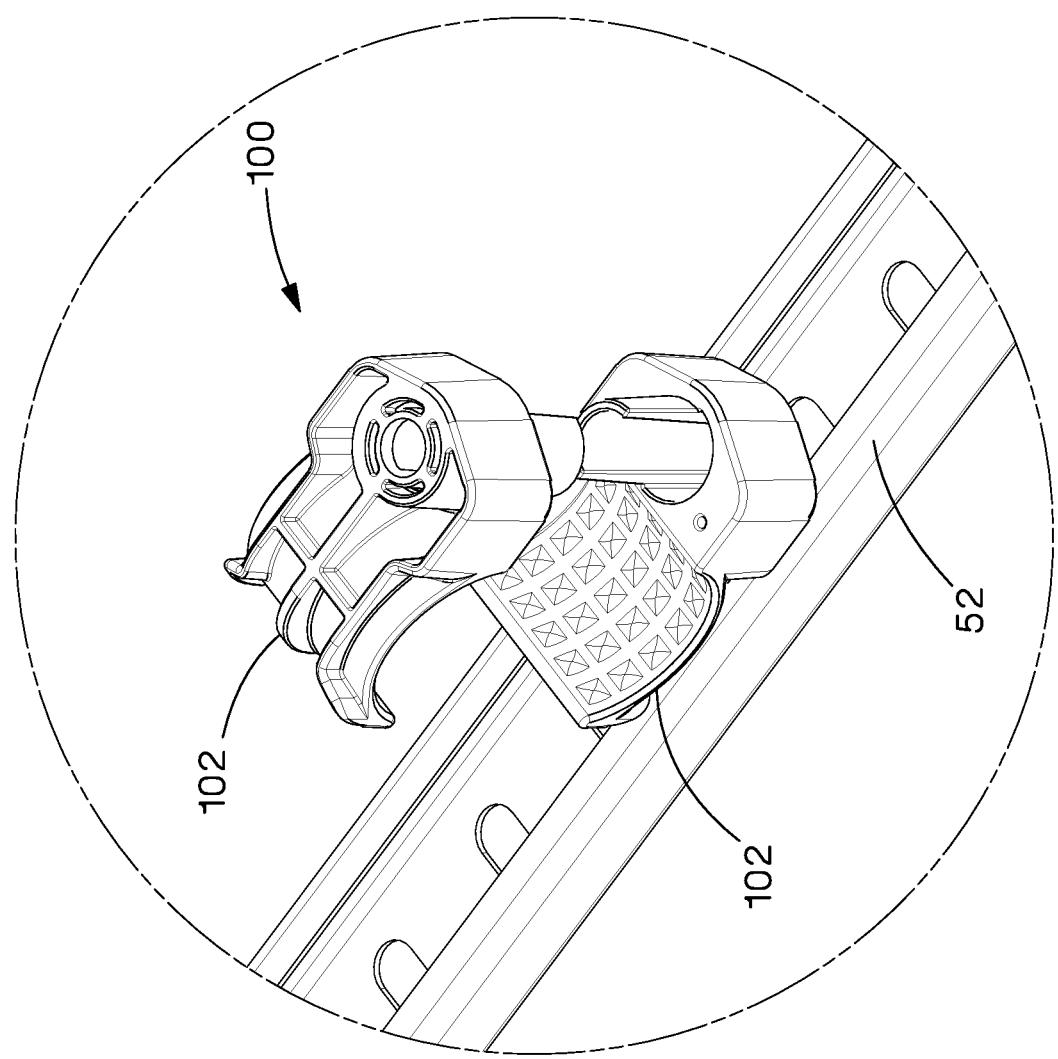
FIG. 8A is a perspective view of the one-hole interlocking cable cleat of FIG. 8.

The sides 118 of the cable cleat half 102 form a face 120 for logo or text placement. The face 120 may be angled to improve the visibility of the text. The back 122 of the cable cleat half 102 includes a wider profile to allow the cable cleat half 102 to sit on open ladder rungs, as illustrated in FIGS. 8 and 8A. The front 124 of the cable cleat half 102 also includes a wider profile with flared ends 126. The increased width of the cable cleat halves 102 allows the user to mount the cable cleat assembly on an inverted or open channel rung without falling into the rung.

The inner surface 110 of the cable cleat half 102 includes a studded gripping surface 112 to engage the cable 60 secured between the cable cleat halves 102. The gripping surfaces 112 include a plurality of spaced apart square pyramid shapes with a cross design. A semi-circular key 114 extends from the inner surface 110 at the mounting hole 128. The remainder of the mounting hole forms a slot 116 for receiving a key 114 from the opposing cable cleat half 102, as discussed below.

Figure 9:
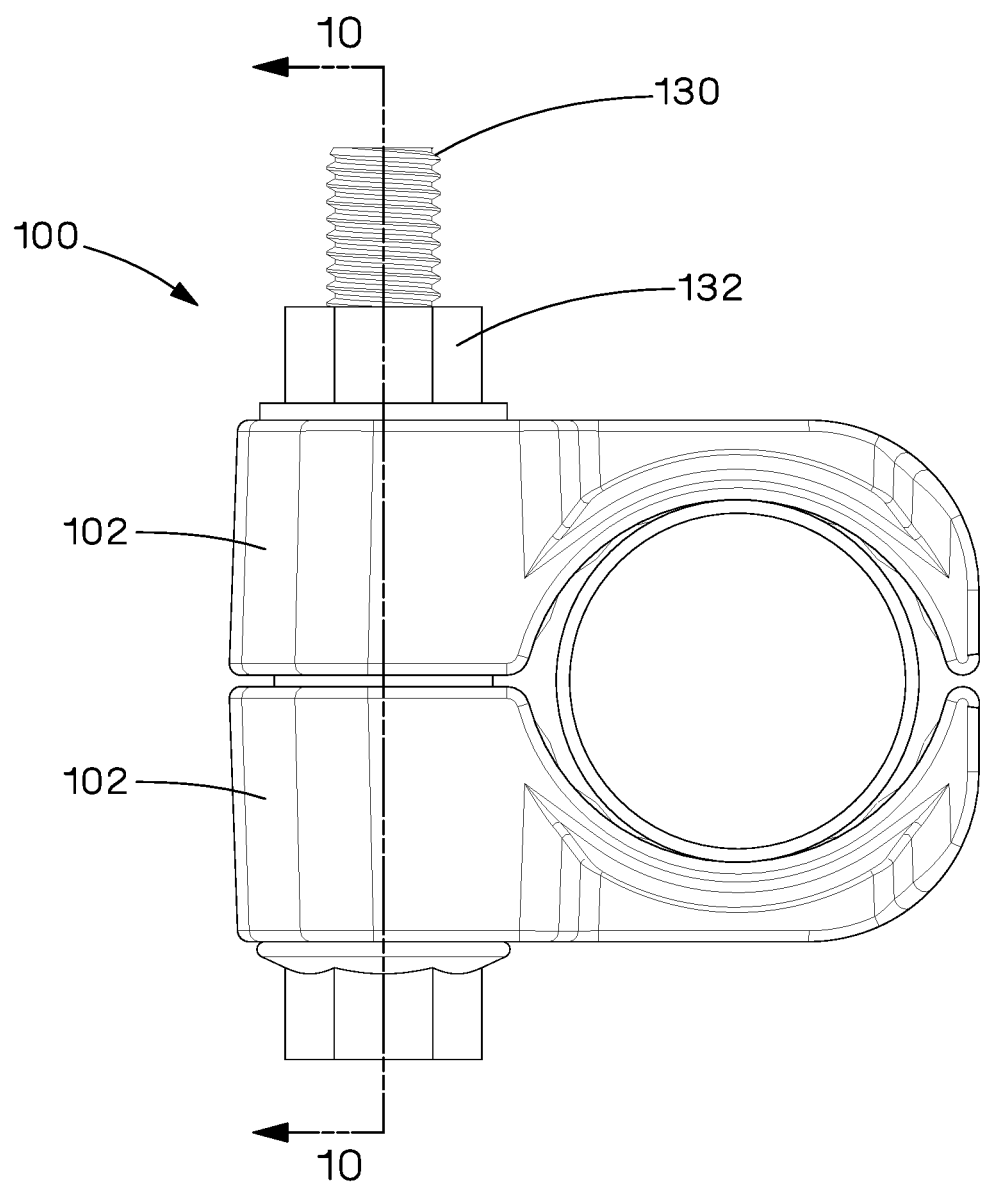
FIG. 9 is a side view of the one-hole interlocking cable cleat assembly of FIG. 1 securing a small diameter cable.
Figure 10:
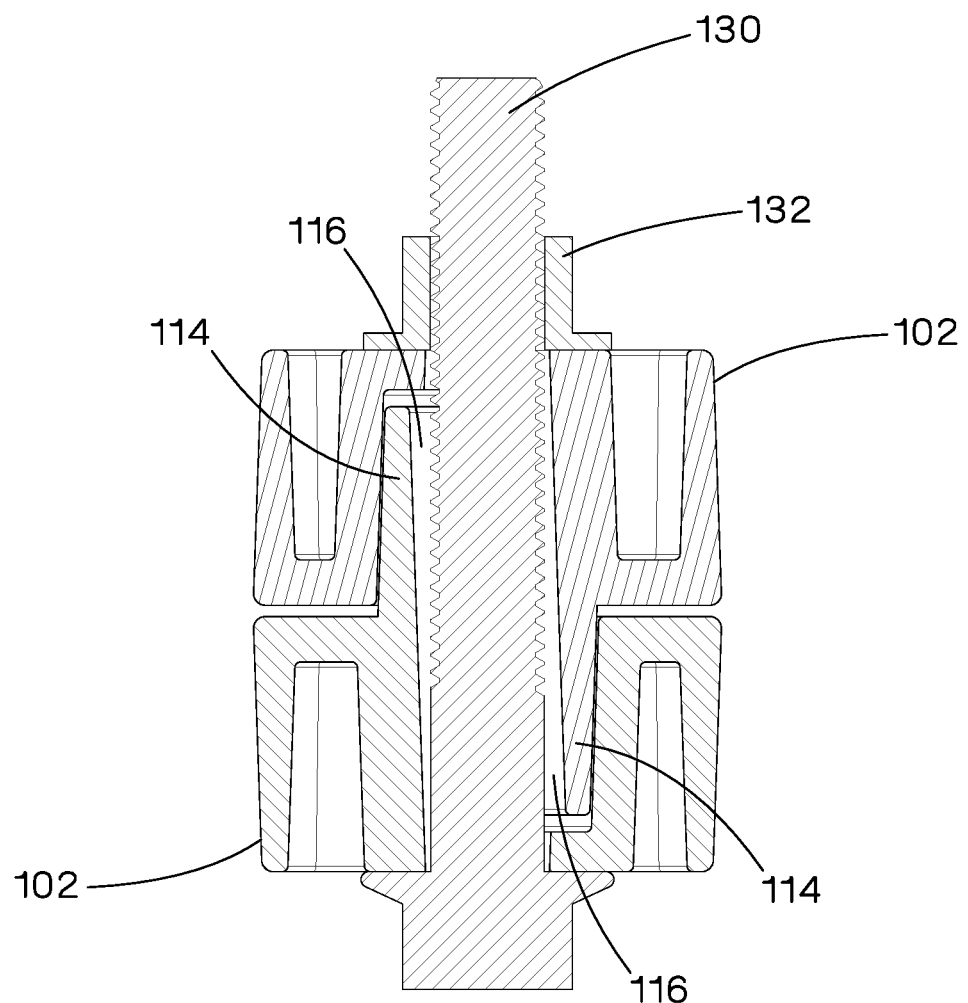
FIG. 10 is a cross sectional view of the one-hole interlocking cable cleat assembly of FIG. 9 taken along line 10-10.
Figure 11:
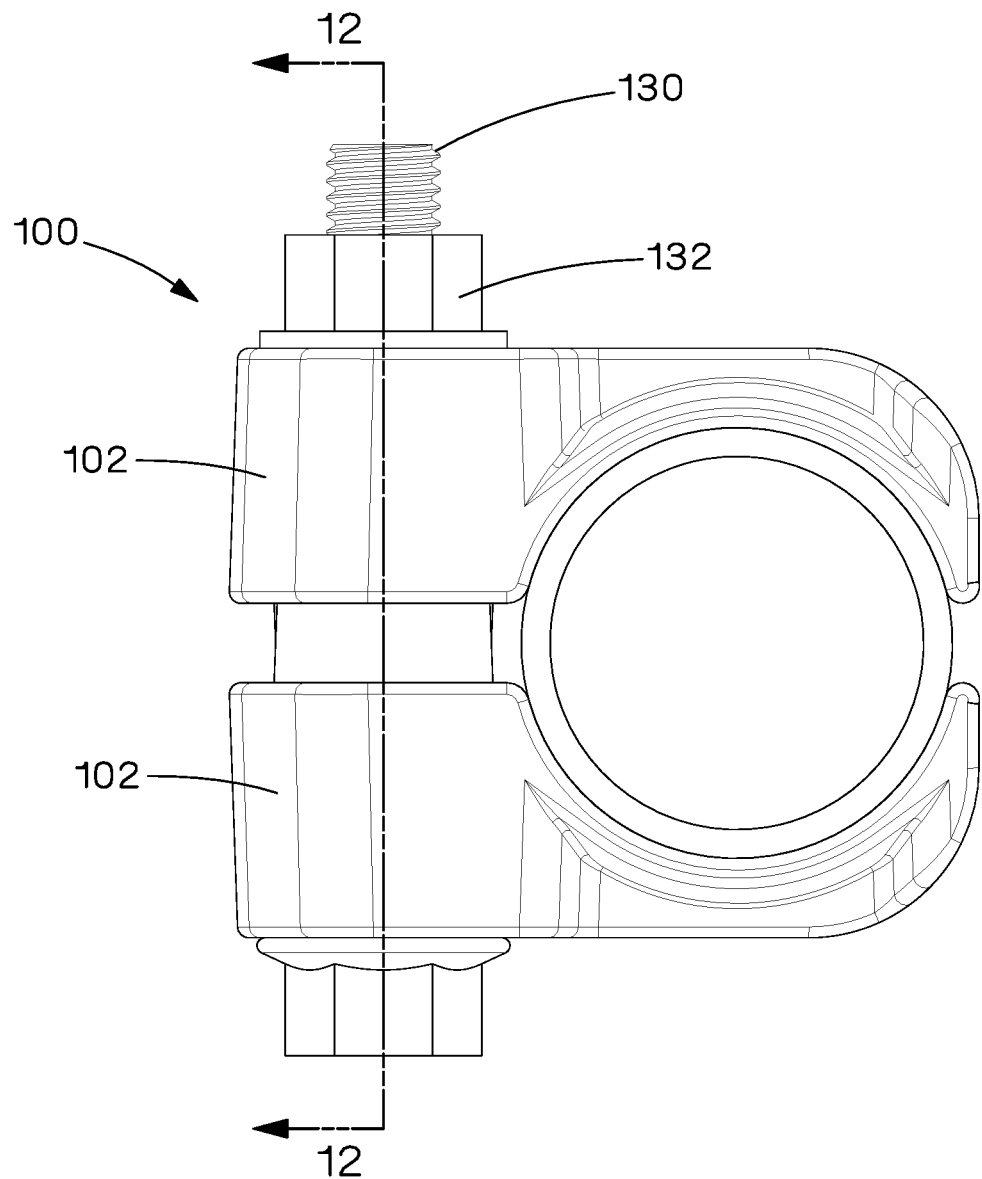
FIG. 11 is a side view of the one-hole interlocking cable cleat assembly of FIG. 1 securing a large diameter cable.
Figure 12:
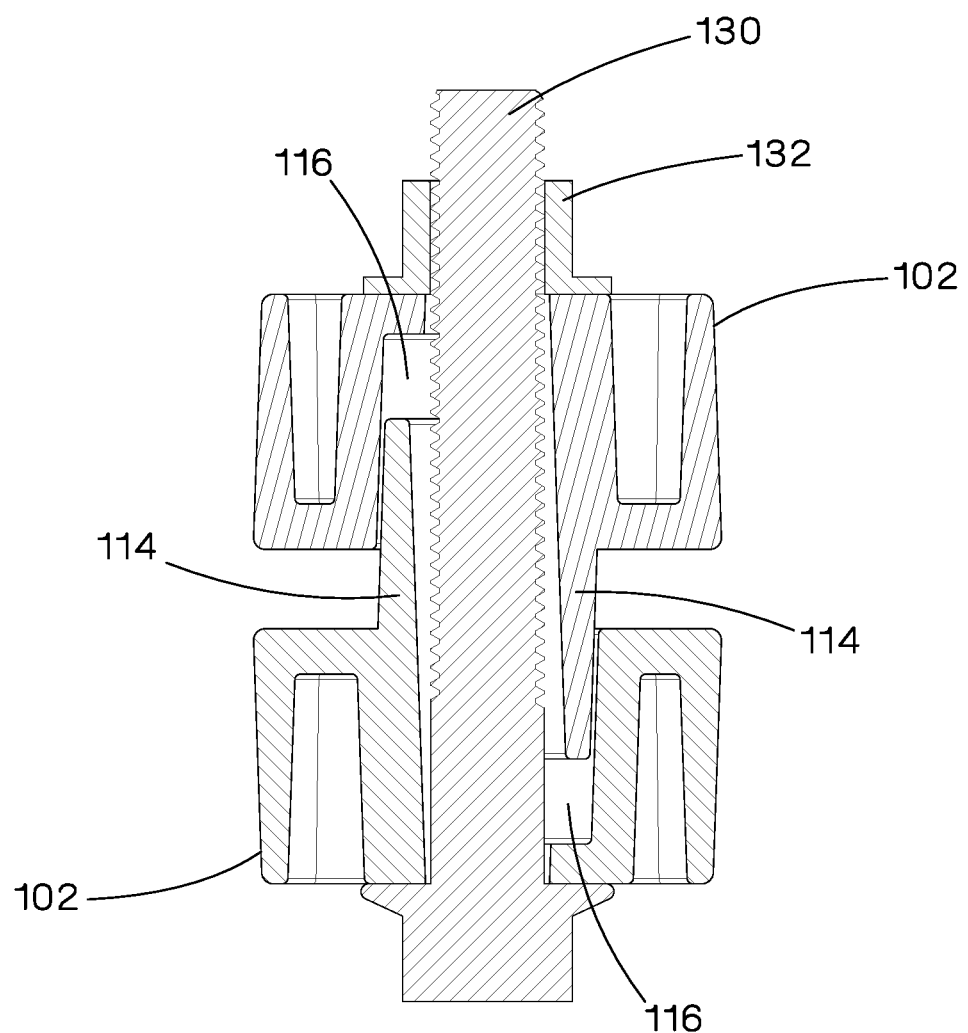
FIG. 12 is a cross sectional view of the one-hole interlocking cable cleat assembly of FIG. 11 taken along line 12-12.

FIGS. 9-12 illustrate the interlocking cable cleat halves 102. As illustrated in FIGS. 10 and 12, the key 114 of one cable cleat half 102 fits into the slot 116 of the other cable cleat half 102. A bolt 130 extends through the mounting holes 128 and is secured by a nut 132 to clamp the cable cleat halves 102 together. The keys 114 surround the bolt 130 to protect the cable insulation from the bolt threads during a short-circuit event. The interlocking arrangement also keeps the cable cleat halves 102 parallel to one another while the bolt 130 is tightened thereby uniformly clamping the cable 60. The interlocking arrangement also prevents rotation of the cable cleat halves 102 relative to one another to aid in installation.

The cable cleat halves 102 can accommodate a range of cable sizes. FIGS. 9-10 illustrate the interlocking cable cleat halves 102 surrounding a small diameter cable. FIGS. 11-12 illustrate the interlocking cable cleat halves 102 surrounding a large diameter cable.

Figure 2:
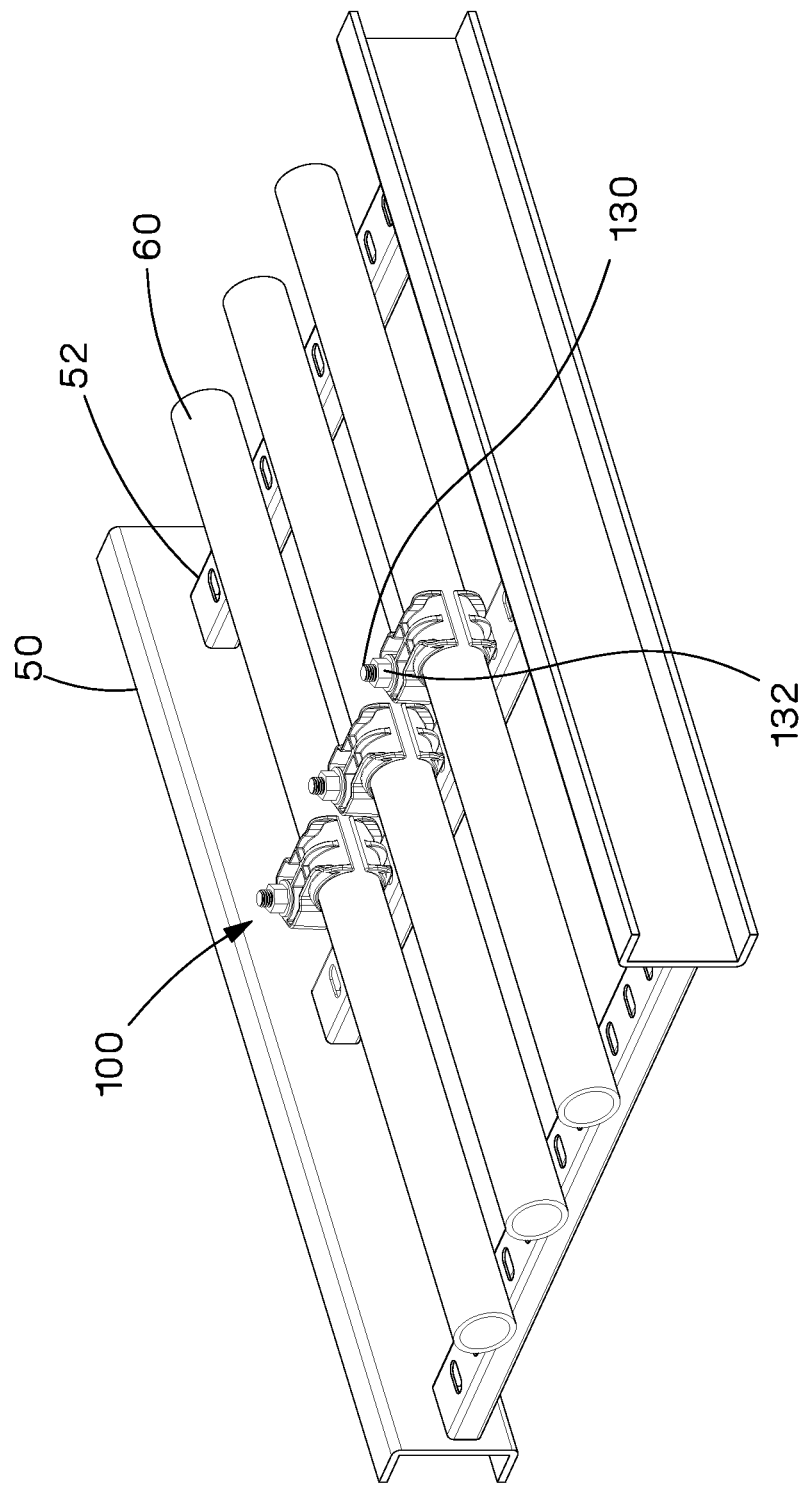
FIG. 2 is a perspective view of a plurality of the one-hole interlocking cable cleat assemblies of FIG. 1 installed on a ladder rack.
Figure 3:
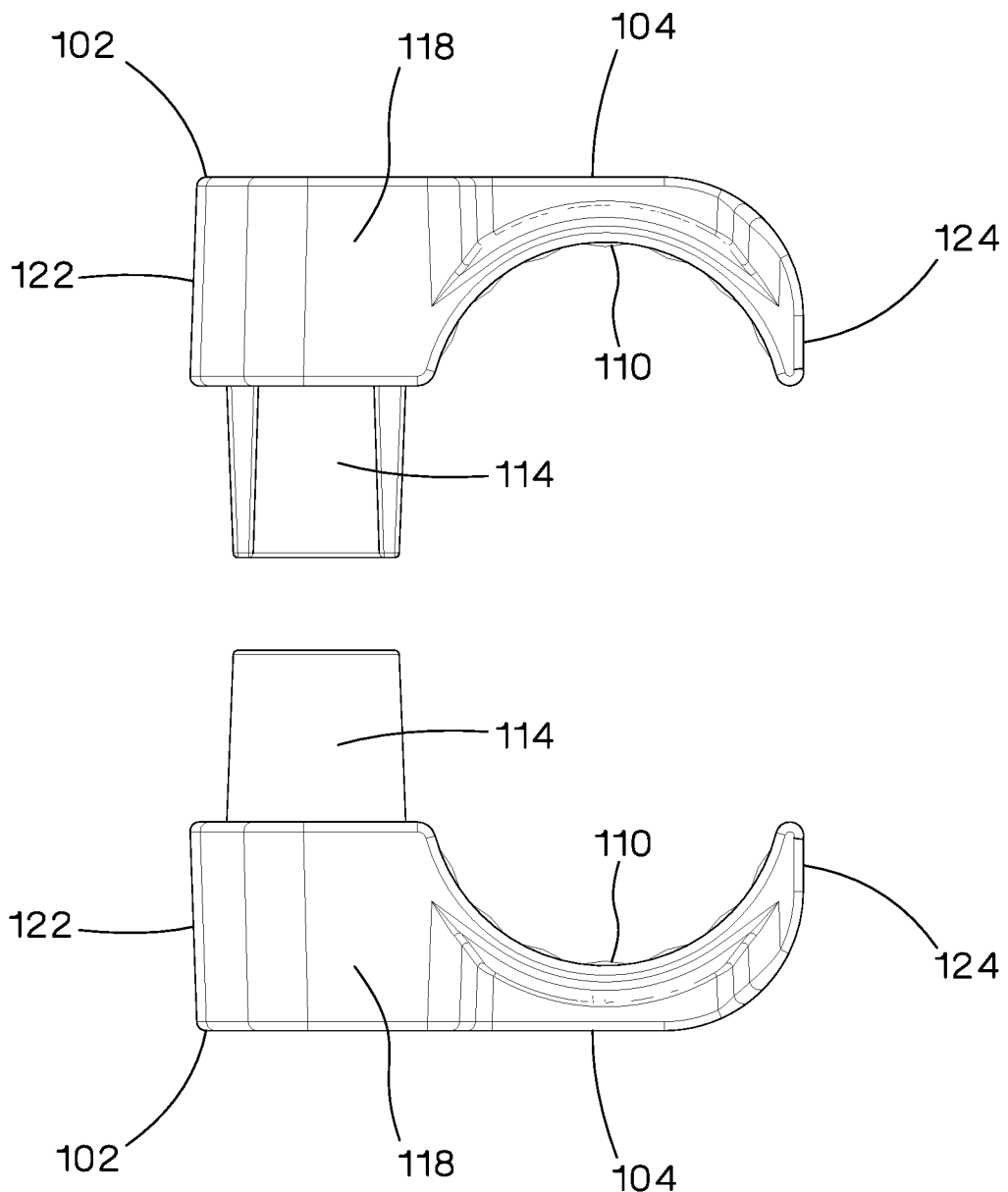
FIG. 3 is a side exploded view of the one-hole interlocking cable cleat of FIG. 1.
Figure 4:
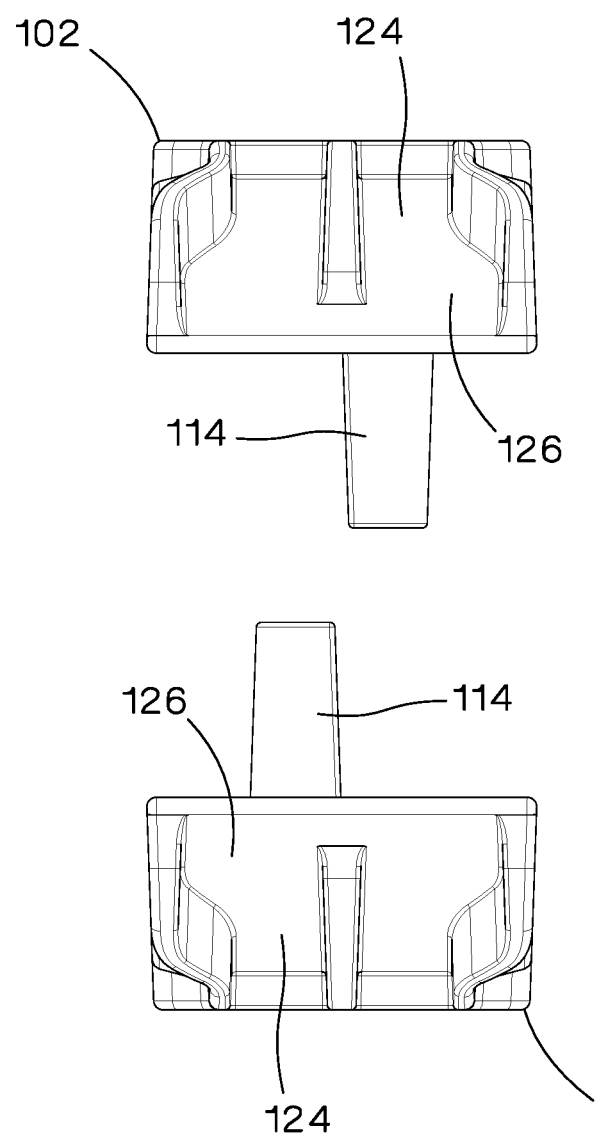
FIG. 4 is a front exploded view of the one-hole interlocking cable cleat of FIG. 1.
Figure 5:
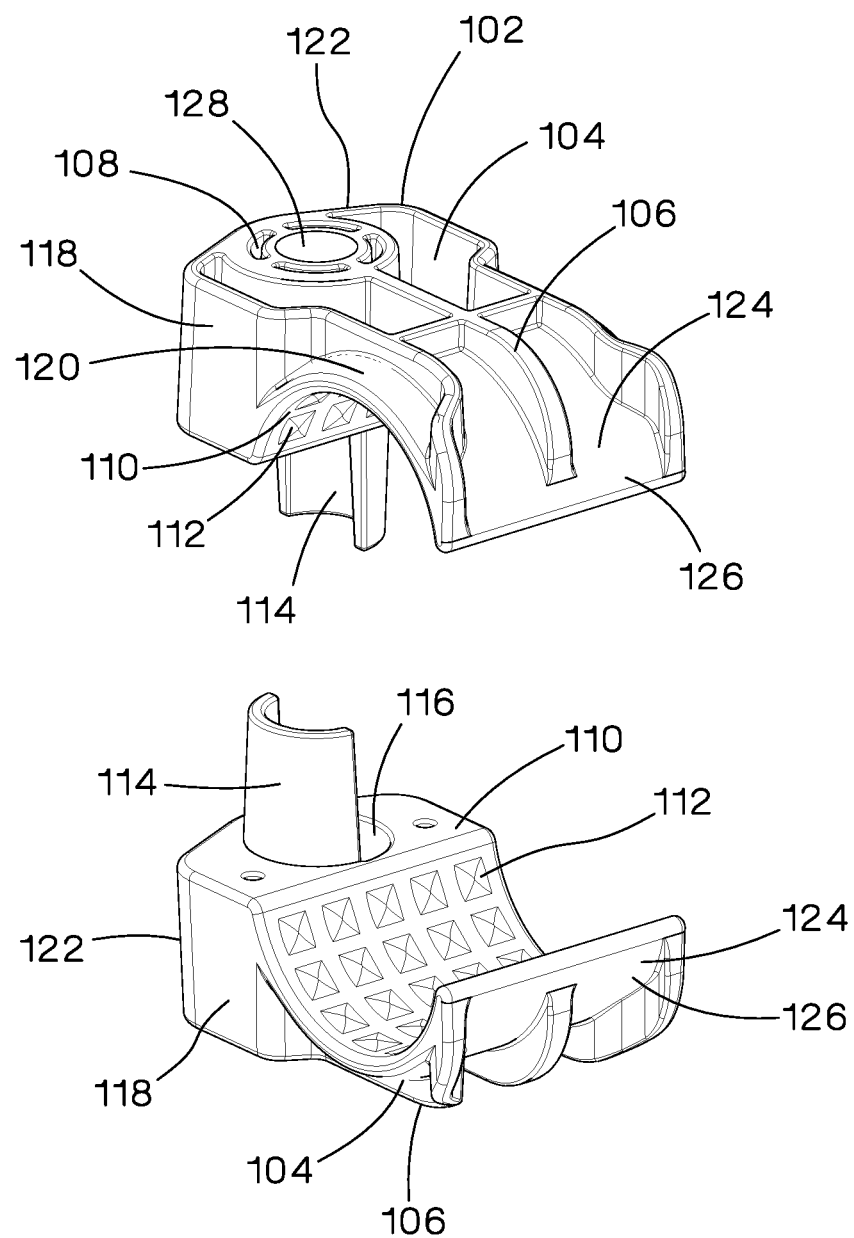
FIG. 5 is an exploded perspective view of the one-hole interlocking cable cleat of FIG. 1.
Figure 6:
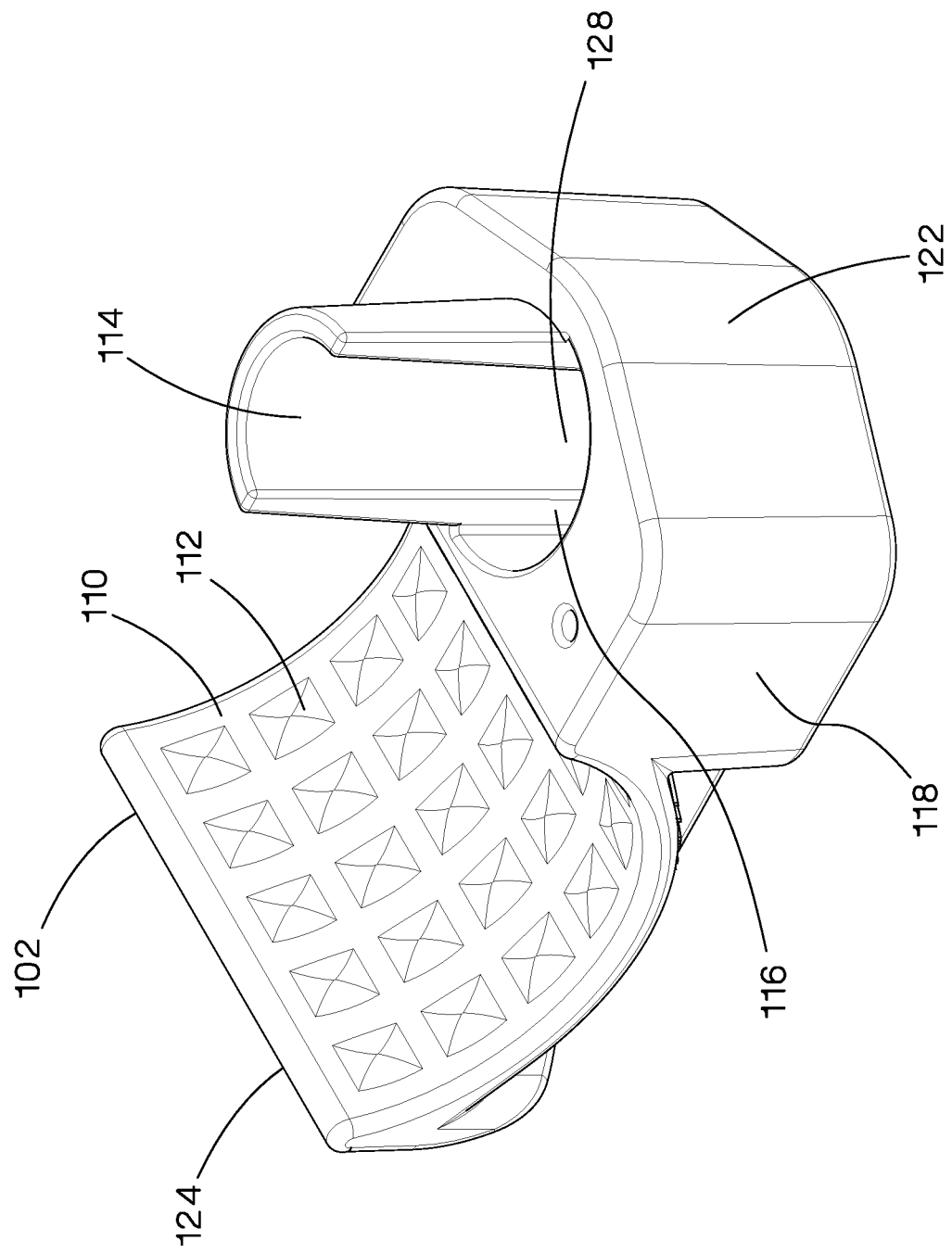
FIG. 6 is a perspective view of one half of the one-hole interlocking cable cleat of FIG. 5.
Figure 7:
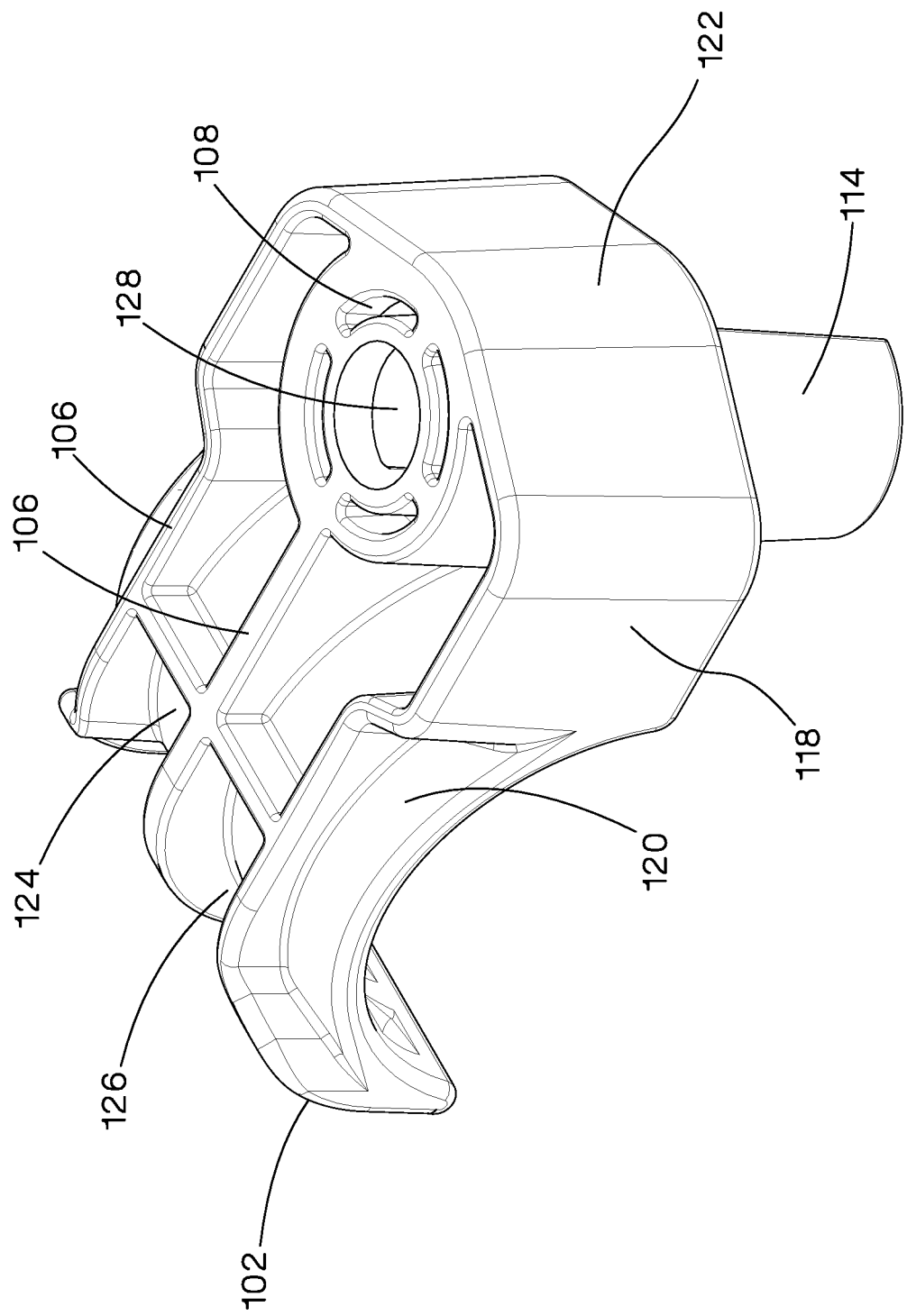
FIG. 7 is a top perspective view of one half of the one-hole interlocking cable cleat of FIG. 5.
Figure 13:
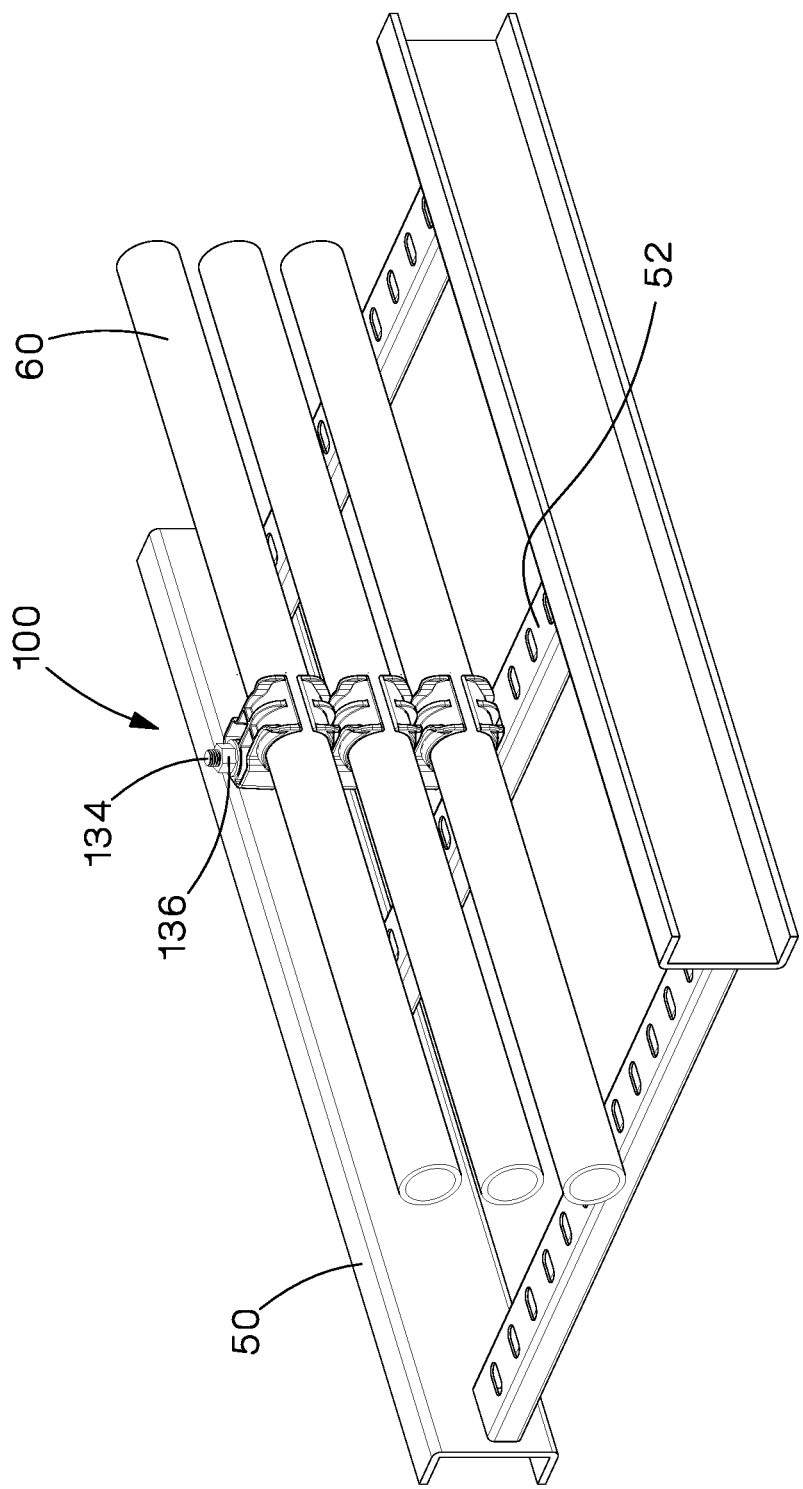
FIG. 13 is a perspective view of a plurality of the one-hole interlocking cable cleat assemblies of FIG. 1 arranged in a stack formation and installed on a ladder rack.
Figure 14:
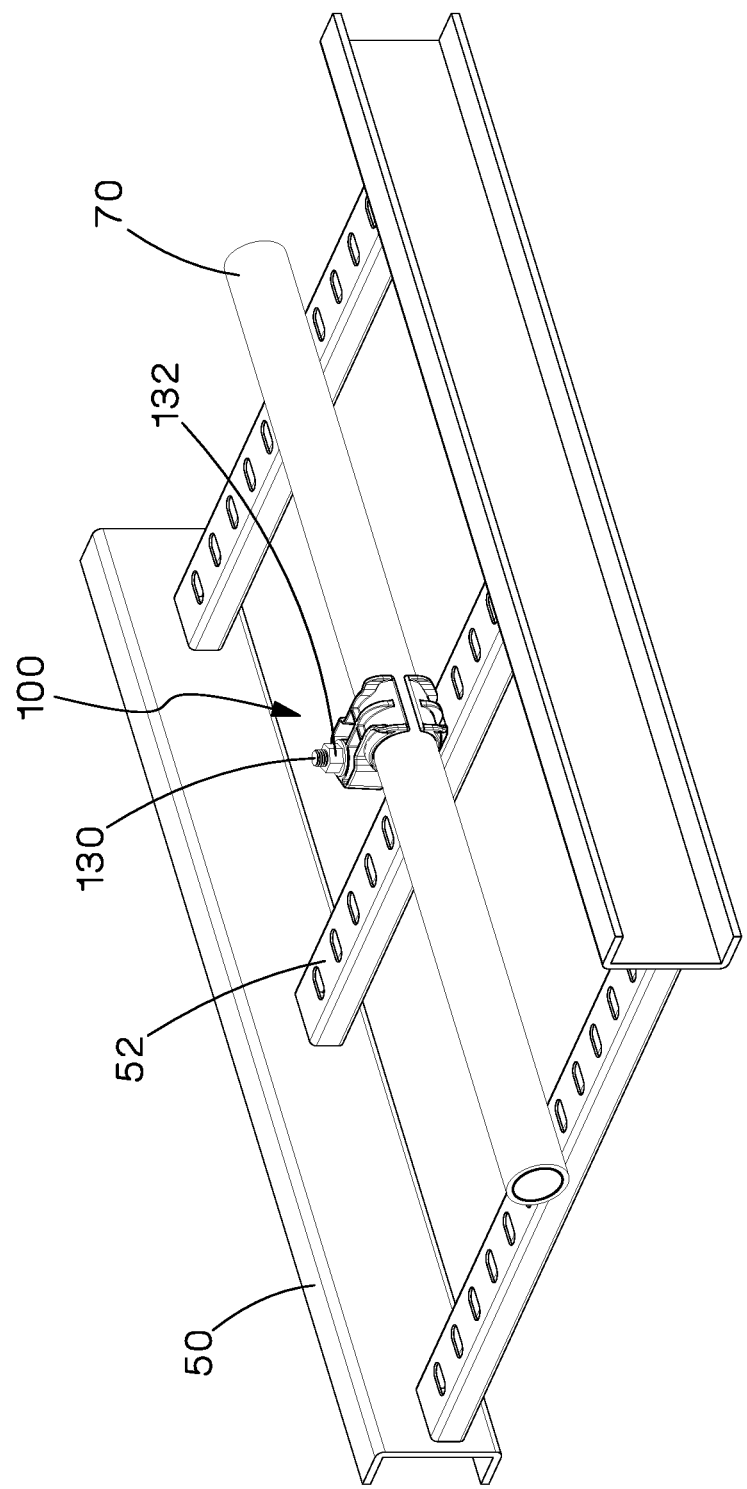
FIG. 14 is a perspective view of the one-hole interlocking cable cleat assembly of FIG. 1 securing a multicore cable installed on a ladder rack.

FIGS. 2, 13, and 14 illustrate various arrangements of the one-hole interlocking cable cleat assemblies 100 of the present invention secured to a ladder rung 52. FIG. 2 illustrates the one-hole interlocking cable cleat assemblies 100 arranged in a flat, parallel arrangement. The cable cleat assemblies 100 are secured to the ladder rung 52 using bolts 130 and nuts 132. FIG. 13 illustrates the one-hole interlocking cable cleat assemblies 100 arranged in a stacked formation. The interlocking cable cleat assemblies 100 are stacked upon one another and are secured to the ladder rung 52 via a threaded rod 134 and nut 136. FIG. 14 illustrates the one-hole interlocking cable cleat assembly 100 securing a multicore cable 70 to a ladder rung 52. The cable cleat assembly 100 is secured to the ladder rung 52 using a bolt 130 and nut 132.

Figure 15:
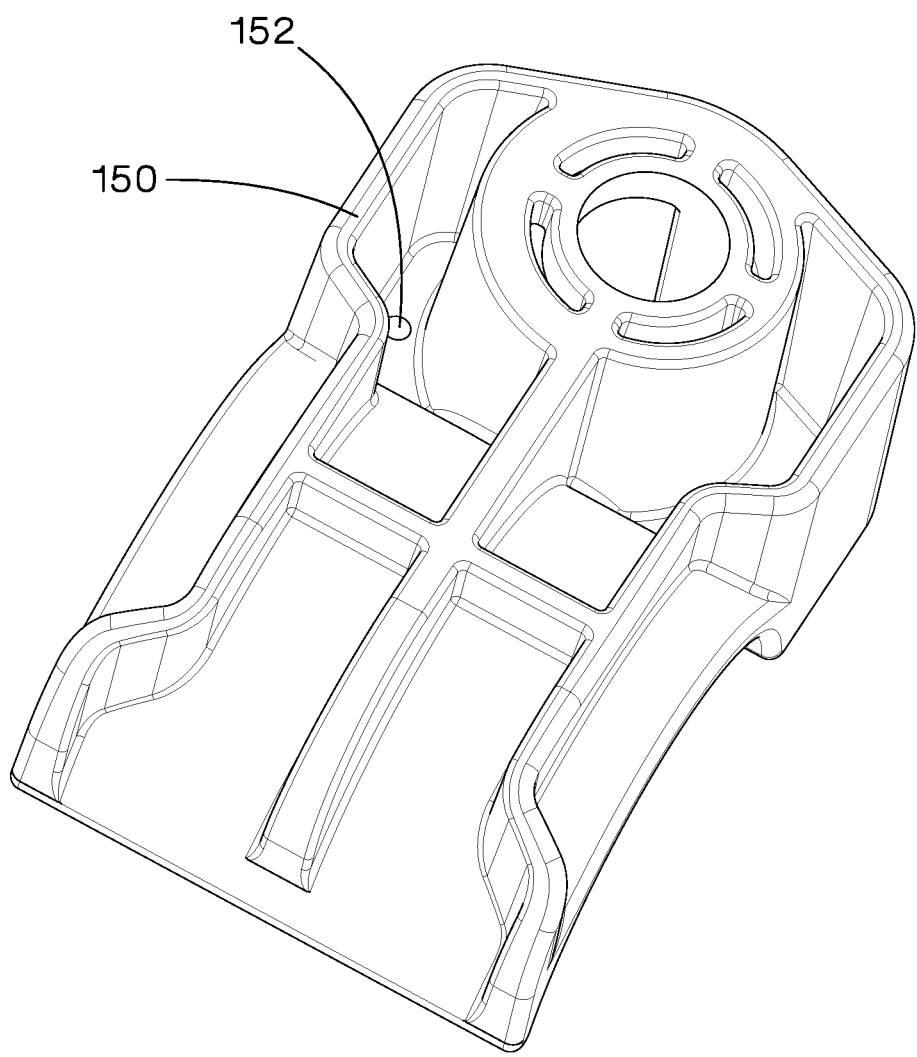
FIG. 15 is a top perspective view of an alternative embodiment of one half of the one-hole interlocking cable cleat of FIG. 7.
Figure 16:
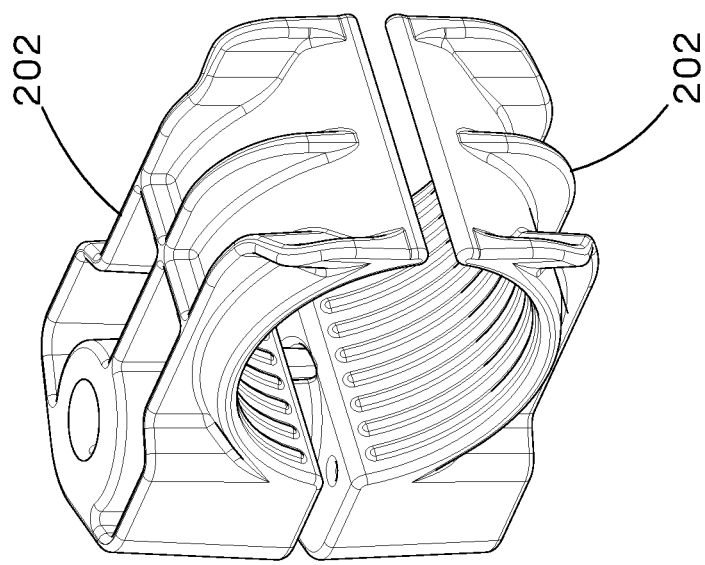
FIG. 16 is a perspective view of an alternative embodiment of the one-hole interlocking cable cleat assembly of the present invention.
Figure 17:
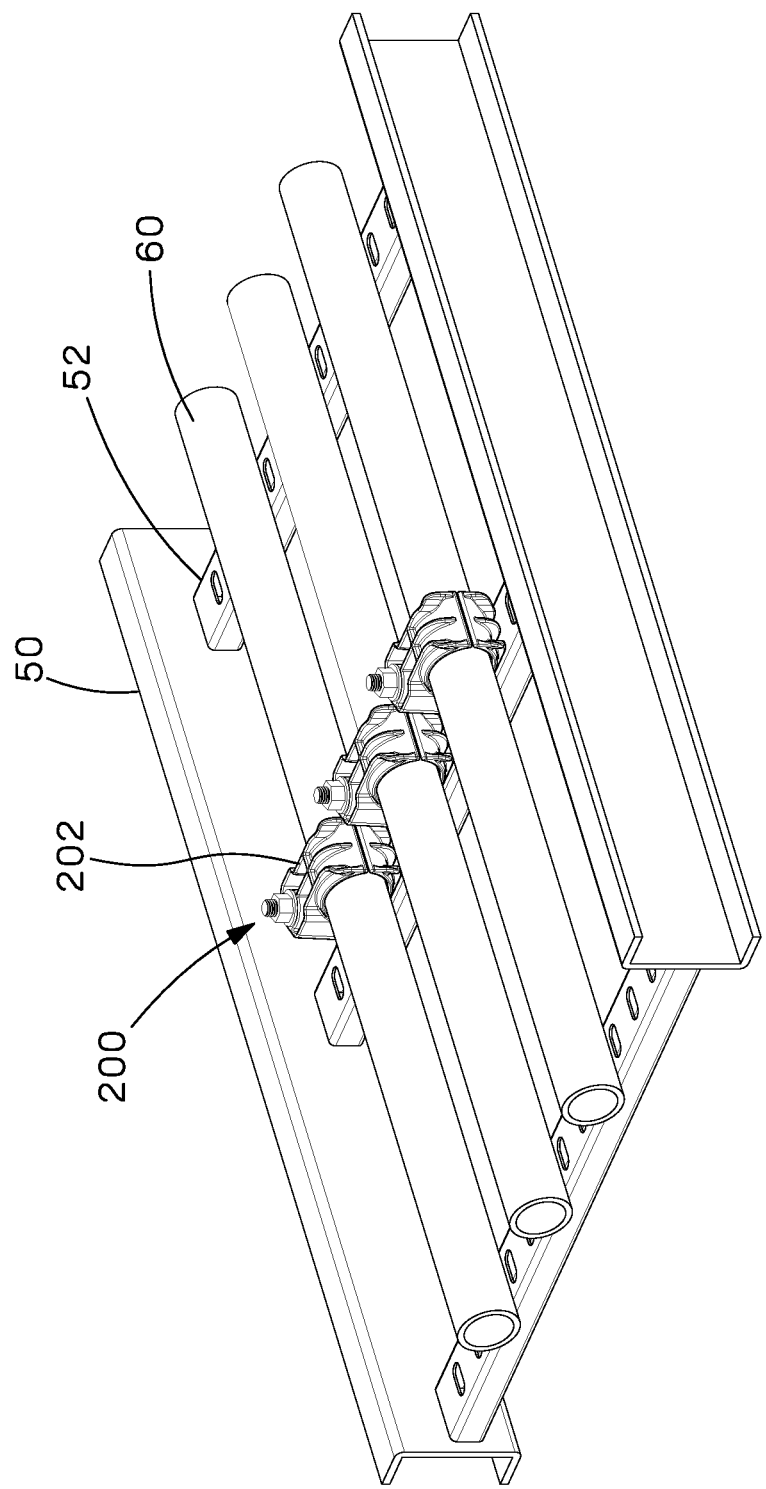
FIG. 17 is a perspective view of a plurality of the one-hole interlocking cable cleat assemblies of FIG. 16 installed on a ladder rack.
Figure 18:
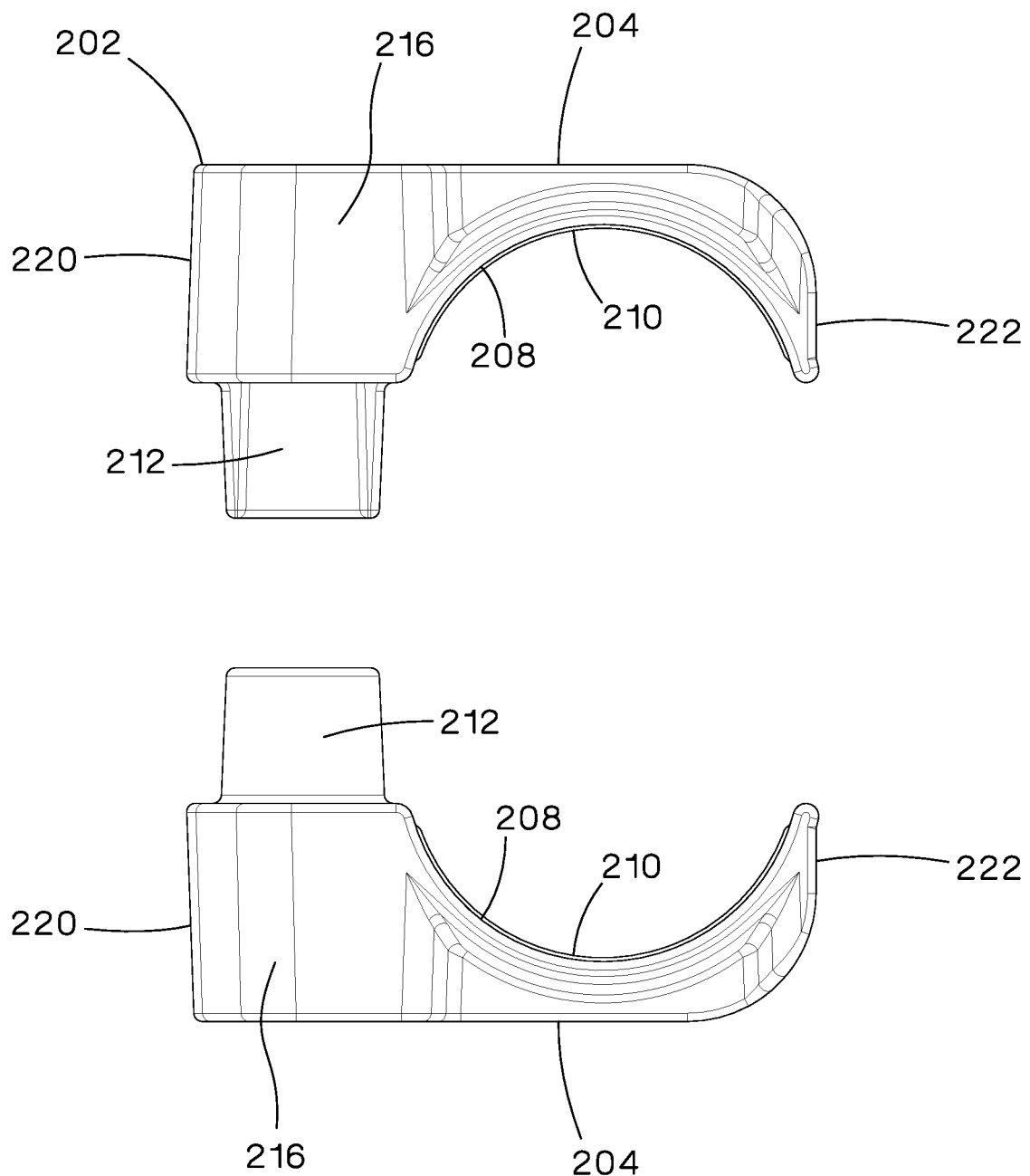
FIG. 18 is a side exploded view of the one-hole interlocking cable cleat of FIG. 16.
Figure 21:
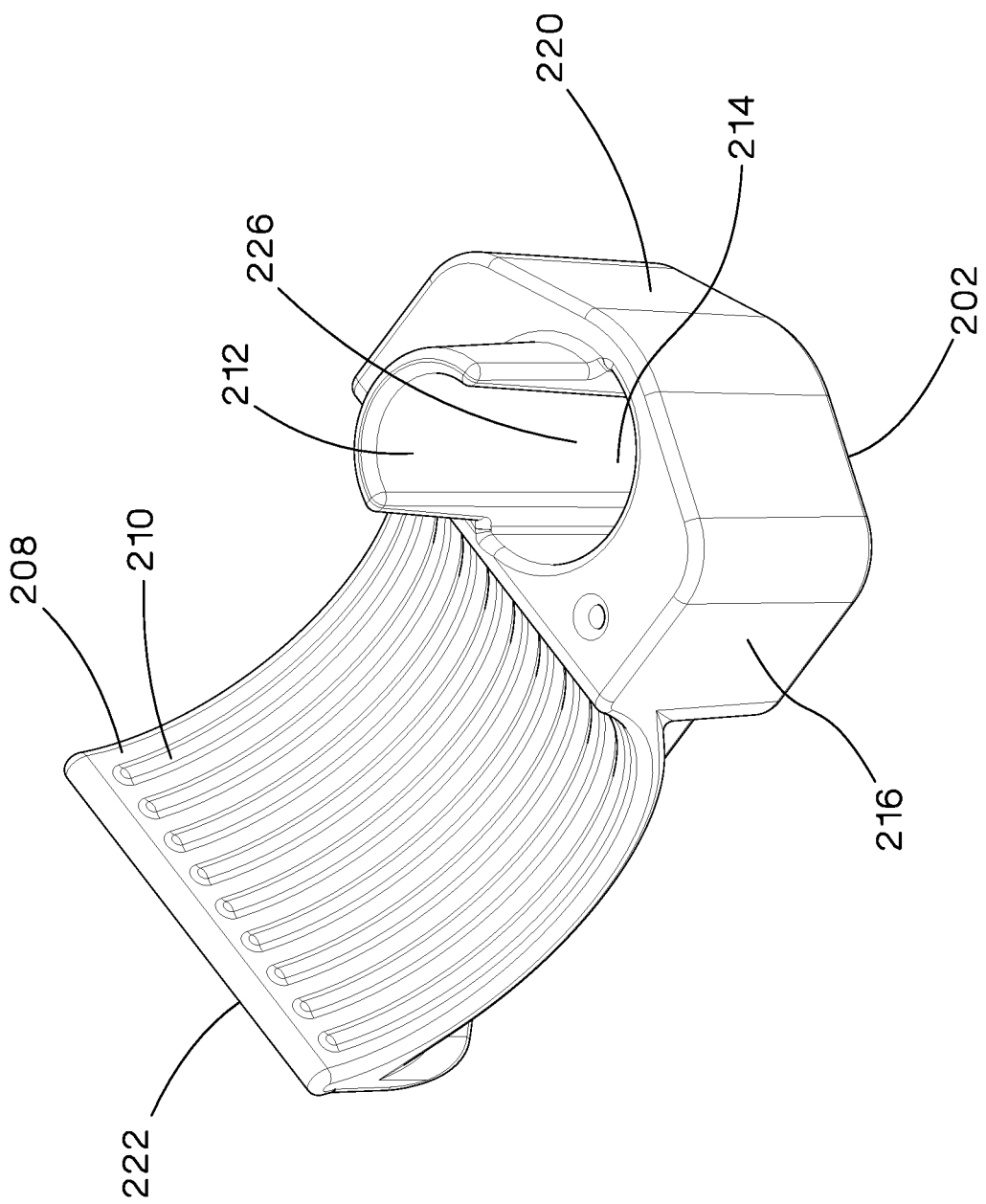
FIG. 21 is a perspective view of one half of the one-hole interlocking cable cleat of FIG. 20.
Figure 22:
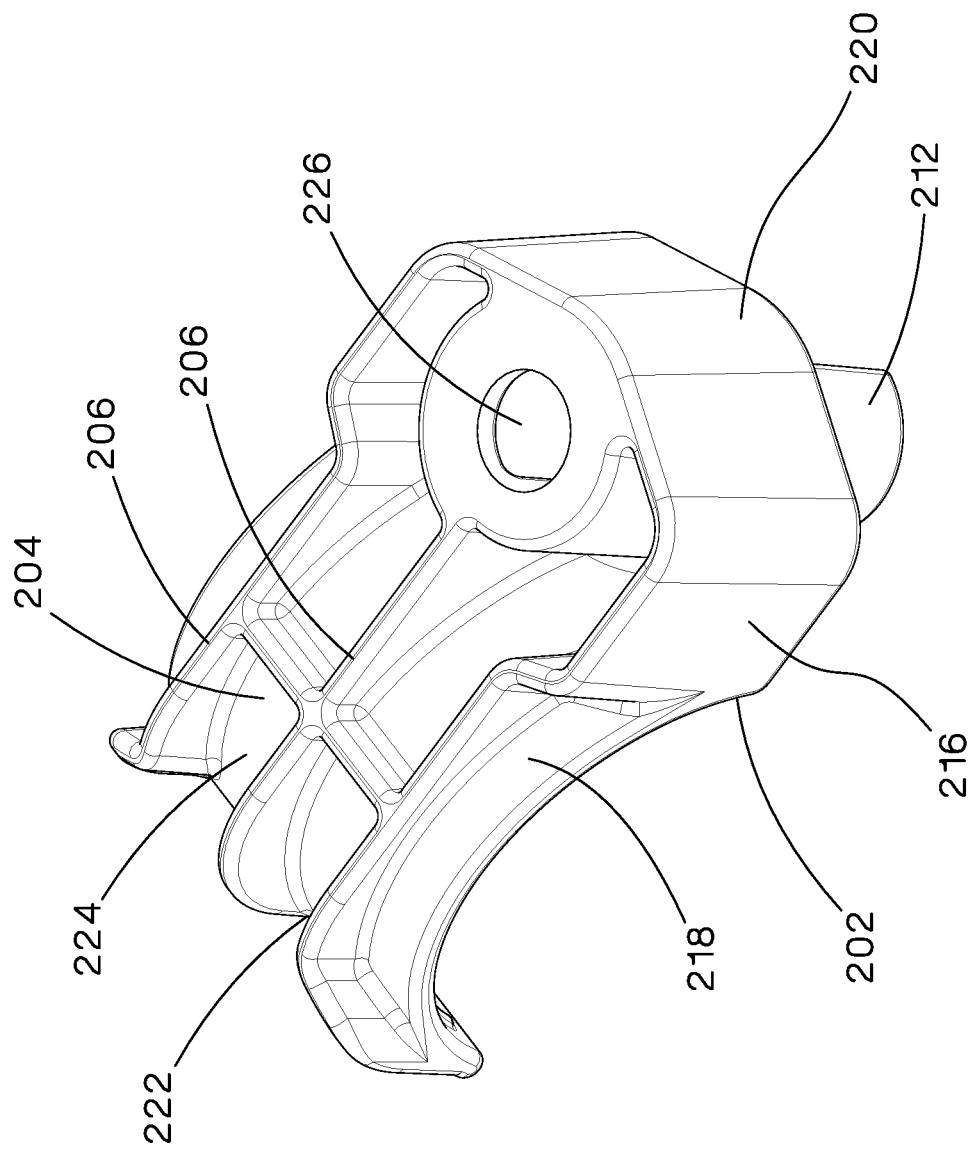
FIG. 22 is a perspective top view of one half of the one-hole interlocking cable cleat of FIG. 20.

Water may collect in the recessed areas of the cable cleat halves when the interlocking cable cleat assemblies 100 are installed outdoors. If the water freezes, it could cause the cable cleat half 102 to crack. FIG. 15 illustrates an alternative embodiment of a cable cleat half 150 to prevent water collection. The cable cleat half 150 could include at least one drain hole 152 to allow water to drain away from the interlocking cable cleat assembly.

FIGS. 16-22 illustrate an alternative embodiment of the one-hole interlocking cable cleat assembly 200 of the present invention. Each cable cleat half 202 includes an outer surface 204, an inner surface 208, sides 216, a back 220 and a front 222. Each cable cleat half 202 also includes a mounting hole 226 extending from the outer surface 204 to the inner surface 208. The outer surface 204 includes a plurality of strengthening ribs 206 that extend a length of the cable cleat half 202.

The sides 216 of the cable cleat half 202 form a face 218 for logo or text placement. The face 218 may be angled to improve the visibility of the text. The back 220 of the cable cleat half 202 includes a wider profile to allow the cable cleat assembly 200 to sit on open ladder rungs. The front 222 of the cable cleat half 202 also includes a wider profile with flared ends 224.

The inner surface 208 of the cable cleat half 202 includes gripping ribs 210 to engage the cable 60 secured between the cable cleat halves 202. The gripping ribs 210 are aligned and extend along the inner surface 208 of the cable cleat half 202. A semi-circular key 212 extends from the inner surface 208 at the mounting hole 226. The remainder of the mounting hole 226 forms a slot 214 for receiving a key 212 from the opposing cable cleat half 202, as discussed above.

Figure 23:
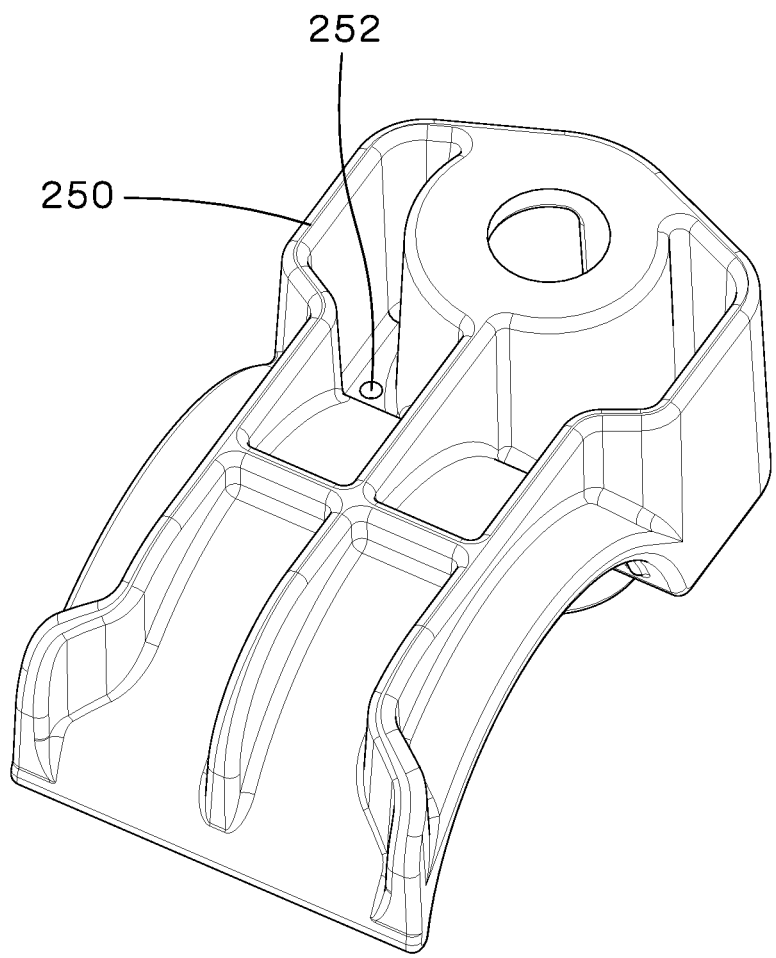
FIG. 23 is a top perspective view of an alternative embodiment of one half of the one-hole interlocking cable cleat of FIG. 22.
Figure 24:
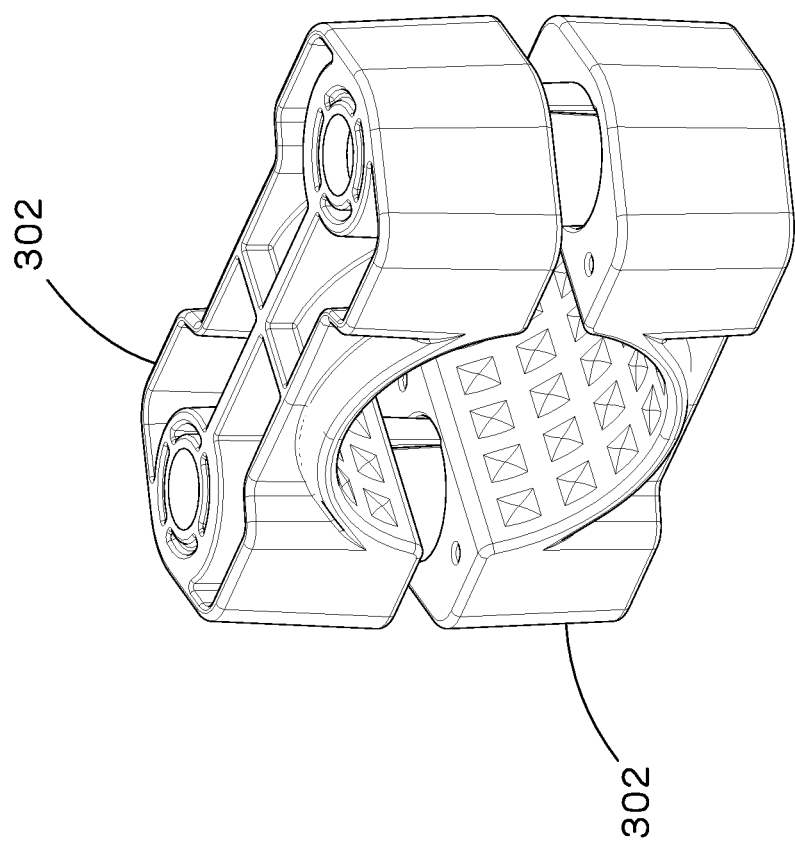
FIG. 24 is a perspective view of a two-hole interlocking cable cleat assembly of the present invention.

FIG. 23 illustrates an alternative embodiment of a cable cleat half 250 with at least one drain hole 252 to prevent water collection when using the cable cleat assembly in outdoor arrangements.

FIGS. 24-36 illustrates a two-hole interlocking cable cleat assembly 300 of the present invention. The two-hole interlocking cable cleat assembly 300 is designed to secure one cable 60 to a ladder rack 50.

The two-hole interlocking cable cleat assembly 300 includes two identical cable cleat halves 302. As illustrated in FIGS. 26-29, each cable cleat half 302 includes an outer surface 304, an inner surface 310, sides 318, a back 322 and a front 324. Each cable cleat half 302 also includes two mounting holes 326 extending from the outer surface 304 to the inner surface 310. The mounting holes 326 are positioned at the back 322 and front 324 of each cable cleat half 302. The outer surface 304 includes a plurality of strengthening ribs 306 that extend a length of the cable cleat half 302. The outer surface 304 also includes a strengthening rib 306 that extends between the mounting holes 326. The outer surface 304 may also include a plurality of core out slots 308 surrounding the mounting holes 326. The core out slots 308 are for optimizing the molding or casting process of the cable cleat half 302.

Figure 30:
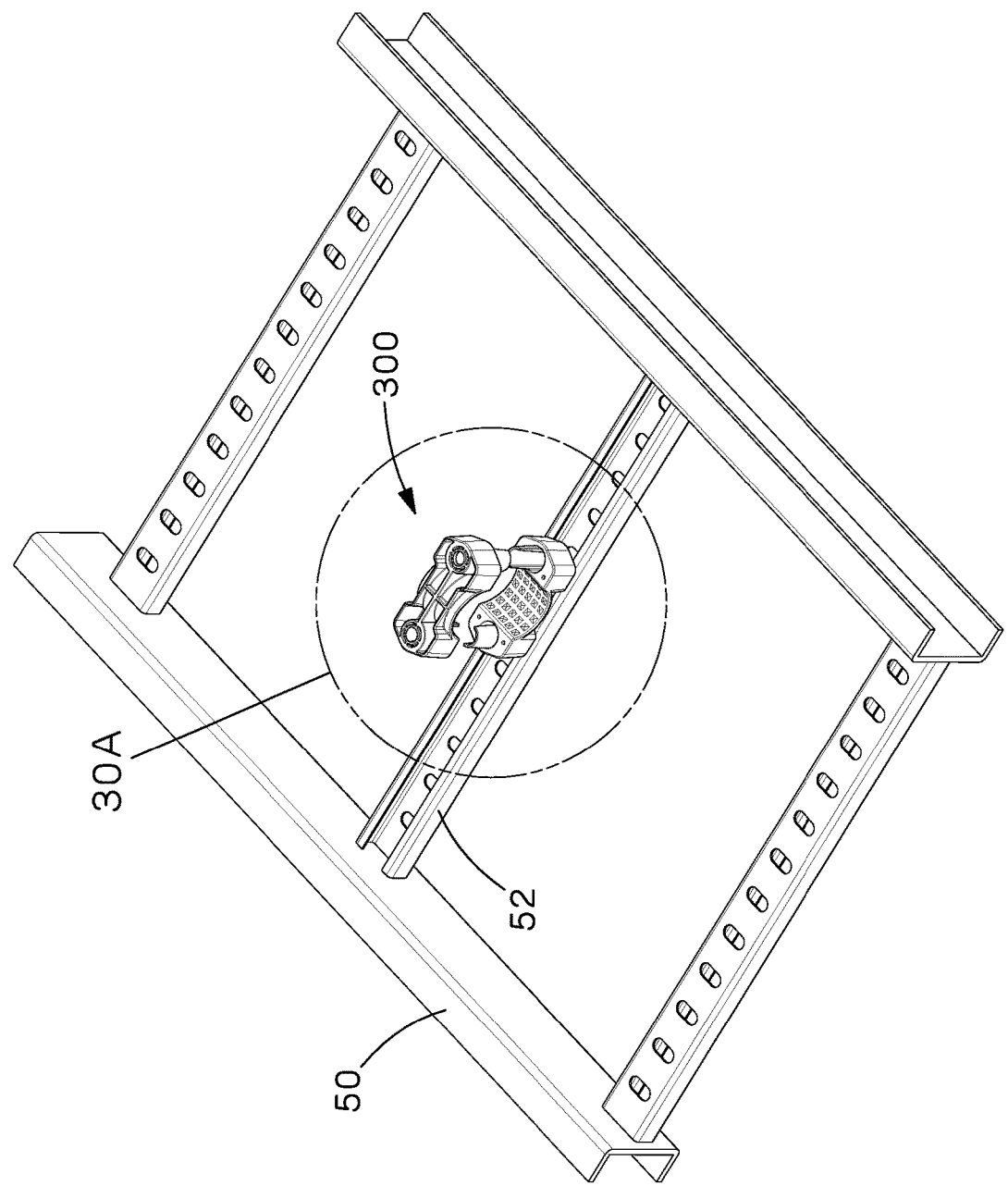
FIG. 30 is a perspective view of the two-hole interlocking cable cleat of FIG. 24 installed on an inverted ladder rung.
Figure 30A:
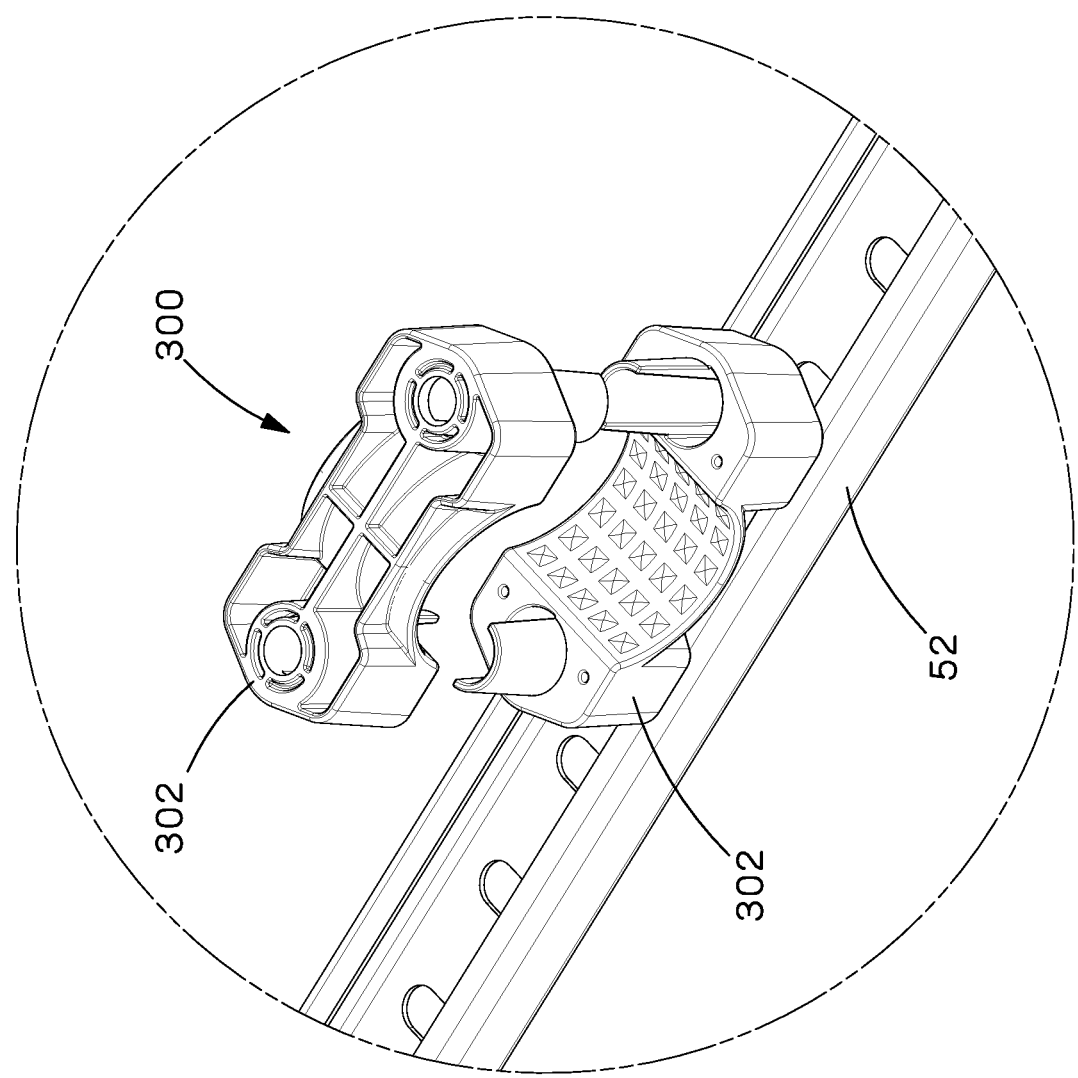
FIG. 30A is a perspective view of the two-hole interlocking cable cleat of FIG. 24.

The sides 318 of the cable cleat half 302 form a face 320 for logo or text placement. The face 320 may be angled to improve the visibility of the text. Each cable cleat half 302 includes a wide profile to allow the cable cleat half 302 to sit on open ladder rungs, as illustrated in FIGS. 30 and 30A. The increased width of the cable cleat halves 302 allows the user to mount the cable cleat assembly 300 on an inverted or open channel rung without falling into the rung.

The inner surface 310 of each cable cleat half 302 includes a studded gripping surface 312 to engage the cable 60 secured between the cable cleat halves 302. The studded gripping surface 312 includes a plurality of spaced apart square pyramid shapes with a cross design. A semi-circular key 314 extends from the inner surface 310 at each mounting hole 326. The remainder of the mounting hole 326 forms a slot 316 for receiving a key 314 from the opposing cable cleat half 302, as discussed below.

Figure 32:
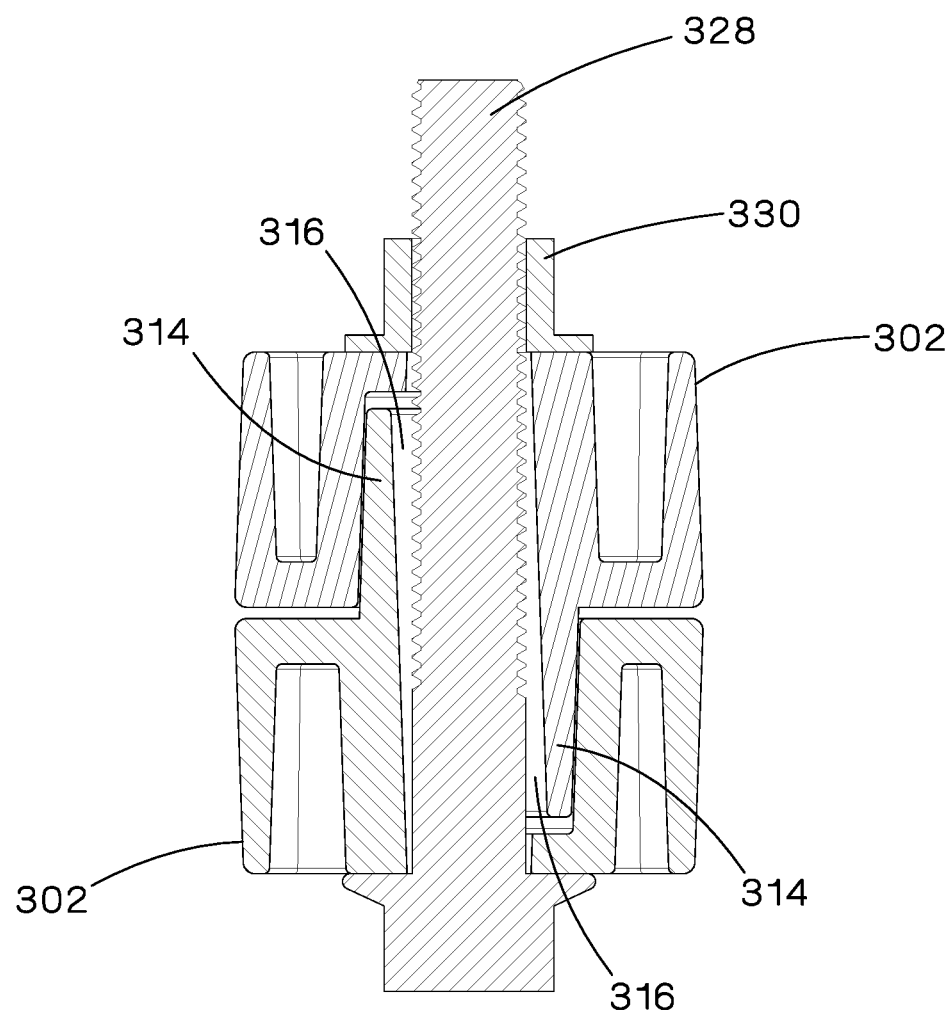
FIG. 32 is a cross sectional view of the two-hole interlocking cable cleat assembly of FIG. 31 taken along line 32-32.
Figure 33:
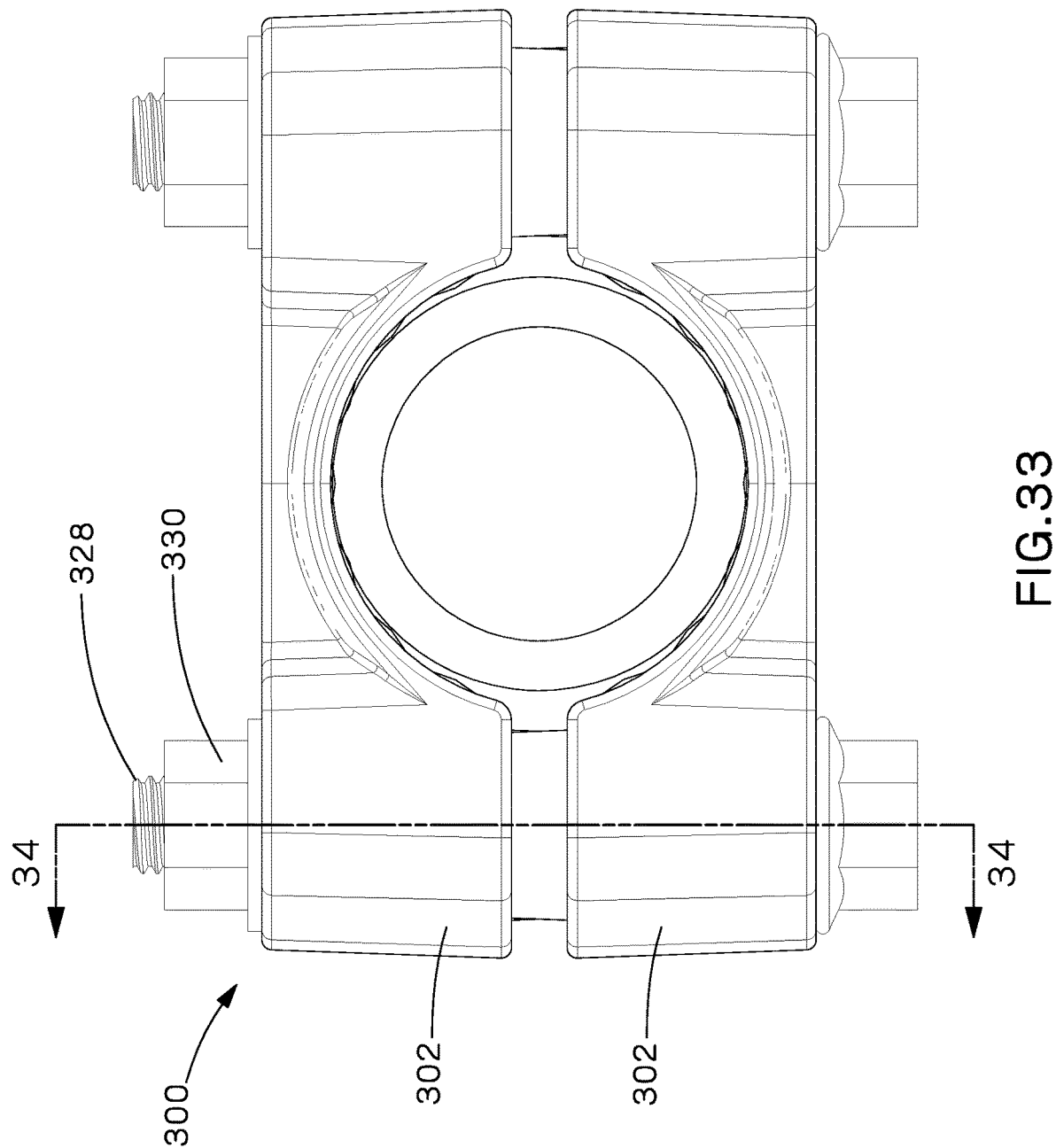
FIG. 33 is a side view of the two-hole interlocking cable cleat assembly of FIG. 24 securing a large diameter cable.
Figure 34:
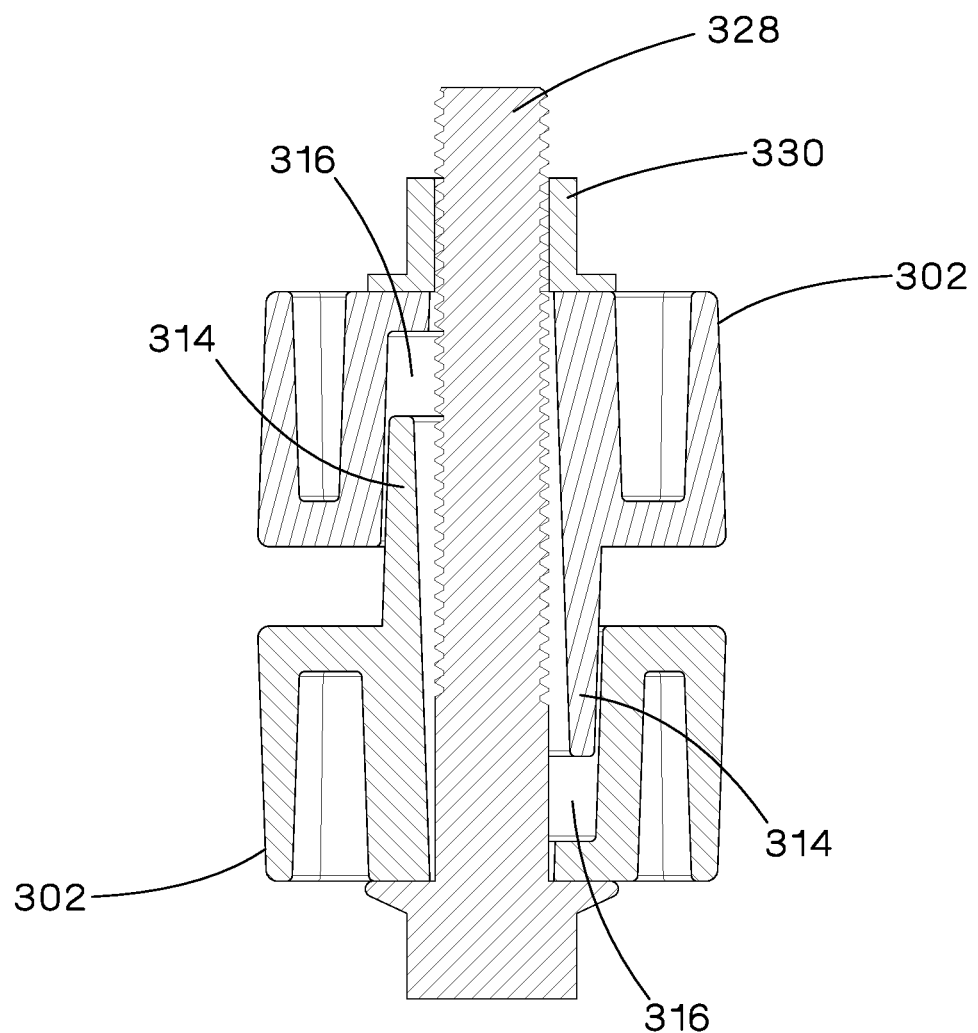
FIG. 34 is a cross sectional view of the two-hole interlocking cable cleat assembly of FIG. 33 taken along line 34-34.

FIGS. 31-34 illustrate the interlocking cable cleat assemblies 300. FIGS. 32 and 34 illustrate one of the mounting holes 326 of the interlocking cable cleat assembly 300. The key 314 of one cable cleat half 302 fits into the slot 316 of the other cable cleat half 302. A bolt 328 extends through the mounting hole 326 and is secured by a nut 330 to clamp the cable cleat halves 302 together. The keys 314 surround the bolt 328 to protect the cable insulation from the bolt threads during a short-circuit event. The interlocking arrangement also keeps the cable cleat halves 302 parallel to one another while the bolt 328 is tightened thereby uniformly clamping the cable 60. The interlocking arrangement also prevents rotation of the cable cleat halves 302 relative to one another to aid in installation.

The cable cleat halves 302 can accommodate a range of cable sizes. FIGS. 31-32 illustrate the interlocking cable cleat assembly 300 surrounding a small diameter cable. FIGS. 33-34 illustrate the interlocking cable cleat assembly 300 surrounding a large dimeter cable.

Figure 25:
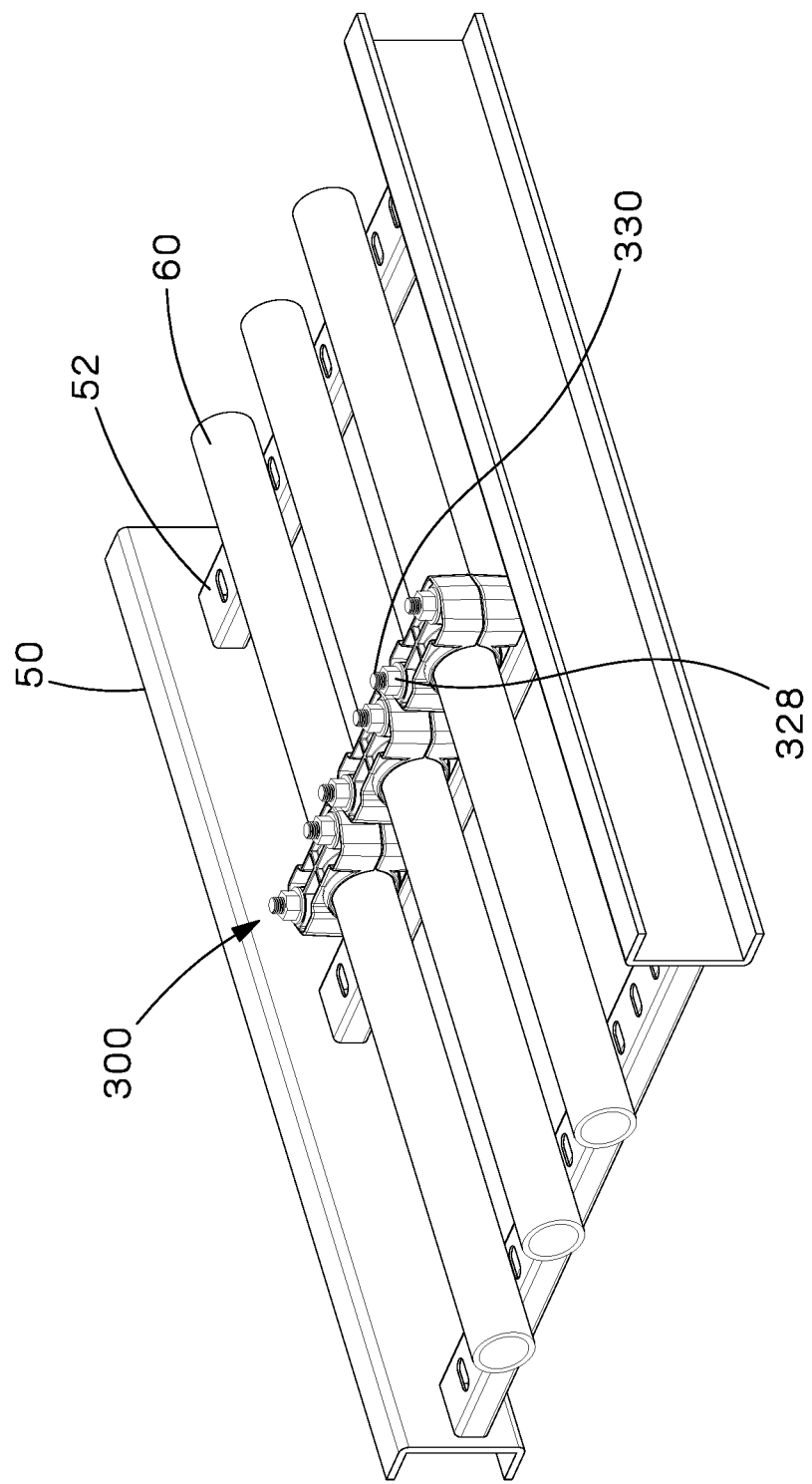
FIG. 25 is a perspective view of a plurality of two-hole interlocking cable cleat assemblies of FIG. 24 installed on a ladder rack.
Figure 26:
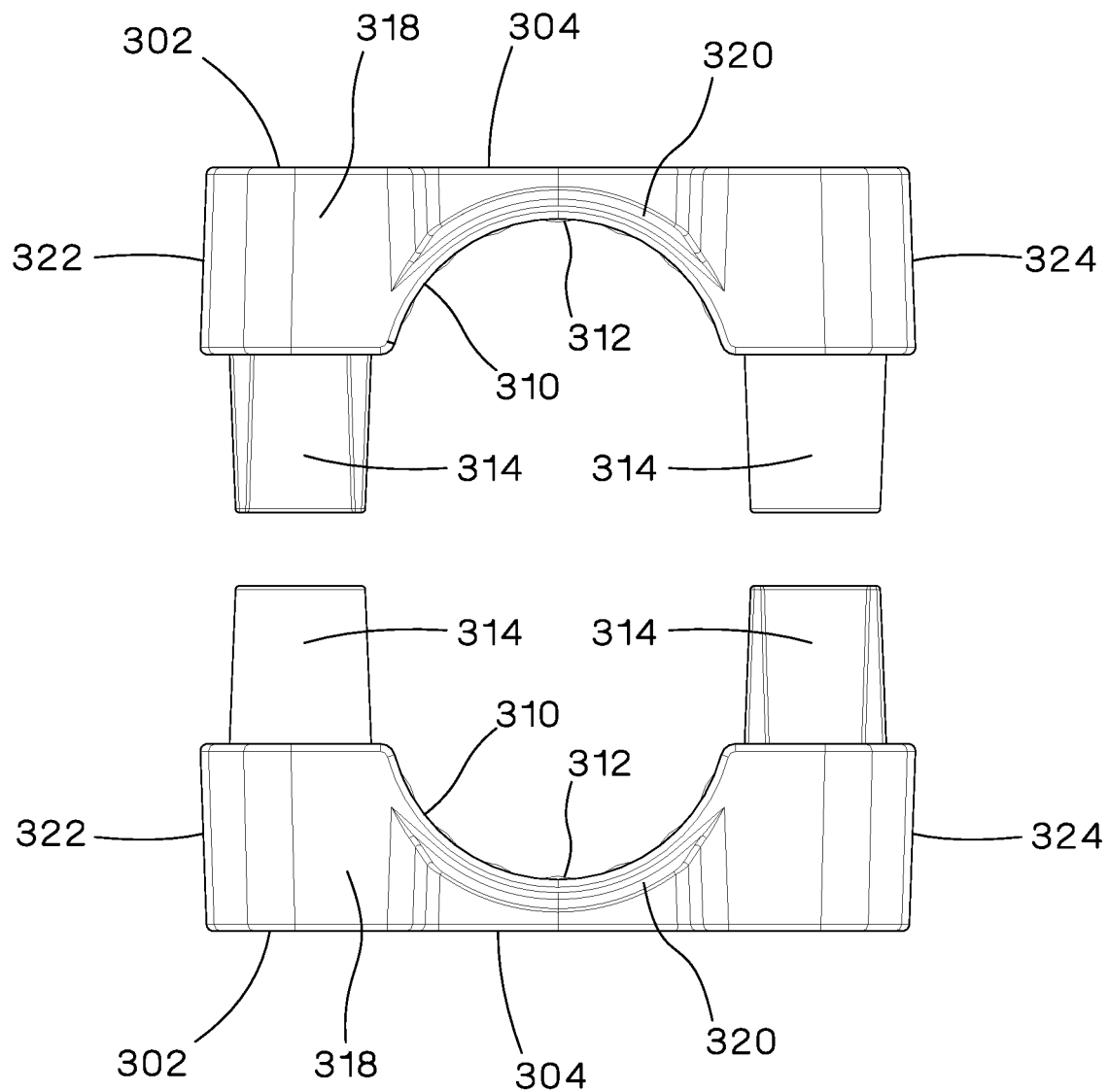
FIG. 26 is an exploded side view of the two-hole interlocking cable cleat of FIG. 24.
Figure 27:
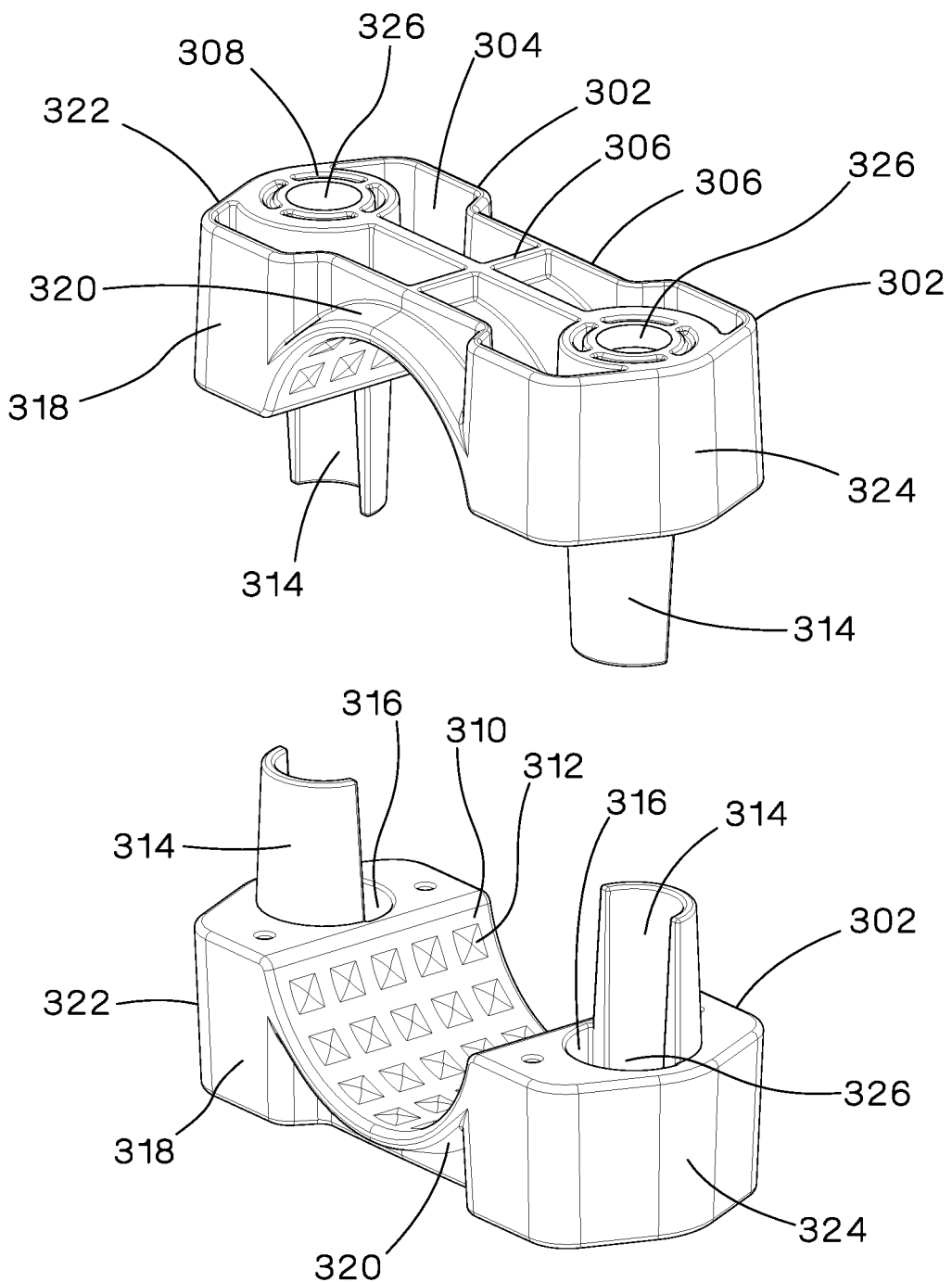
FIG. 27 is an exploded perspective view of the two-hole interlocking cable cleat of FIG. 24.
Figure 28:
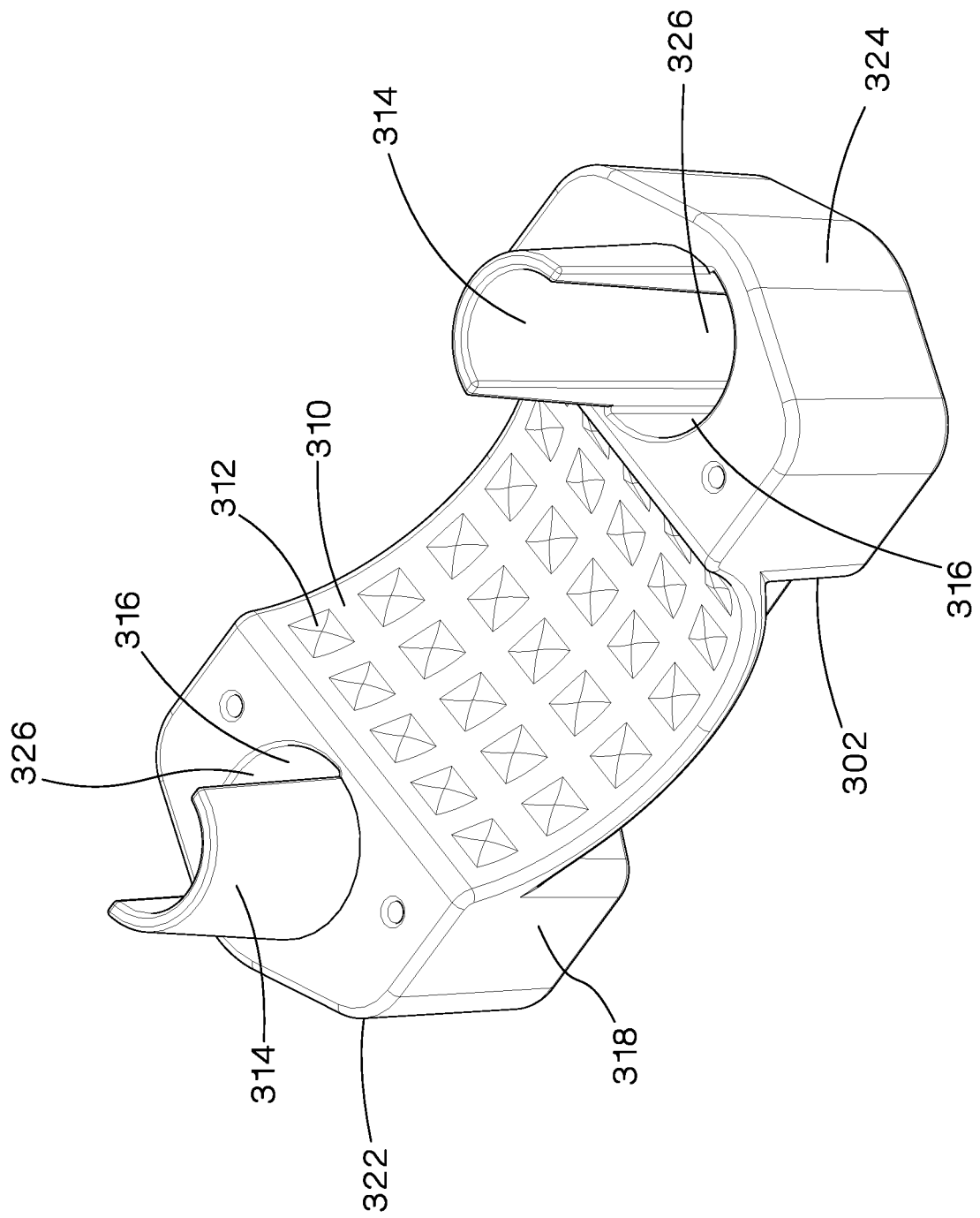
FIG. 28 is a perspective view of one half of the two-hole interlocking cable cleat of FIG. 24.
Figure 29:
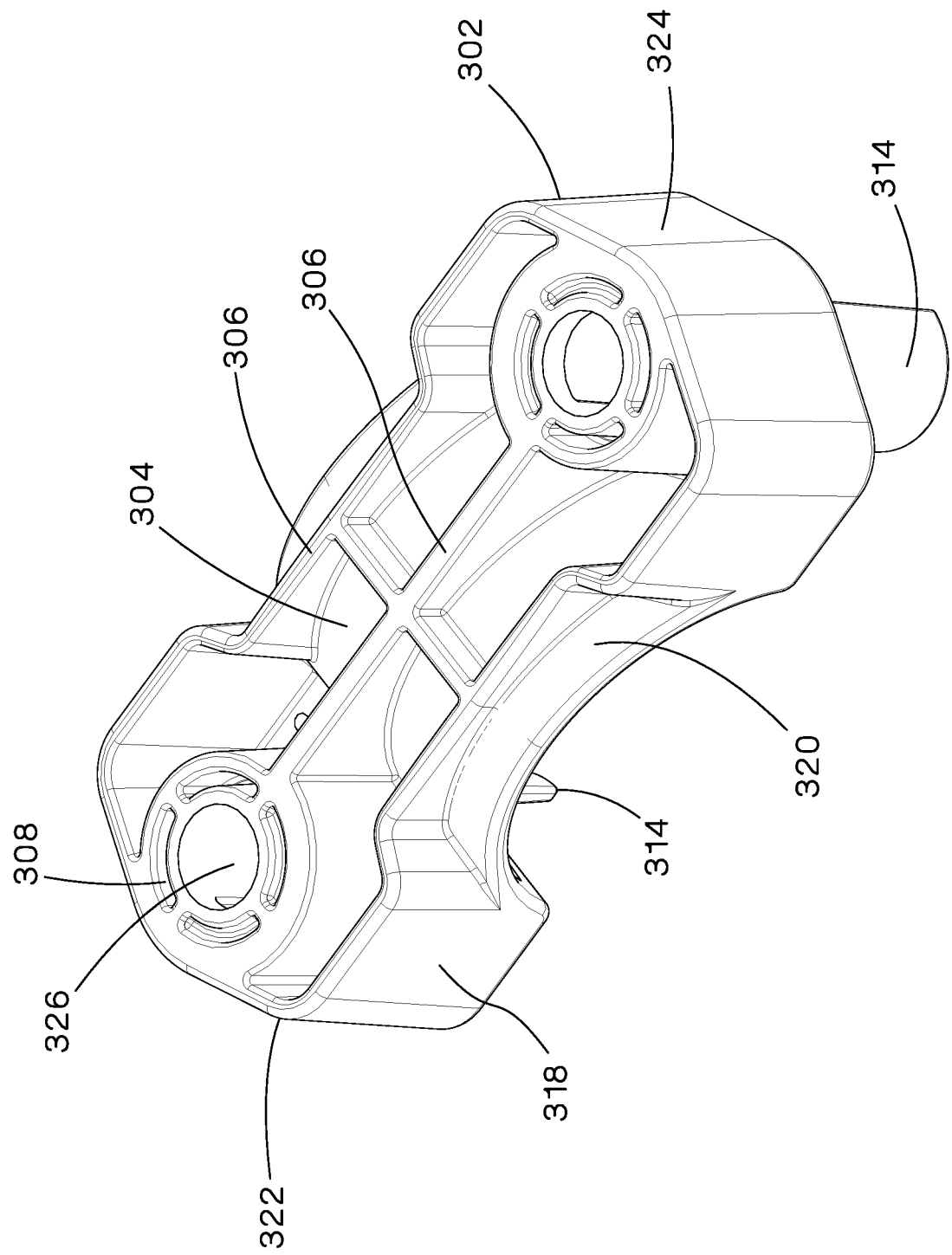
FIG. 29 is a top perspective view of one half of the two-hole interlocking cable cleat of FIG. 24.
Figure 35:
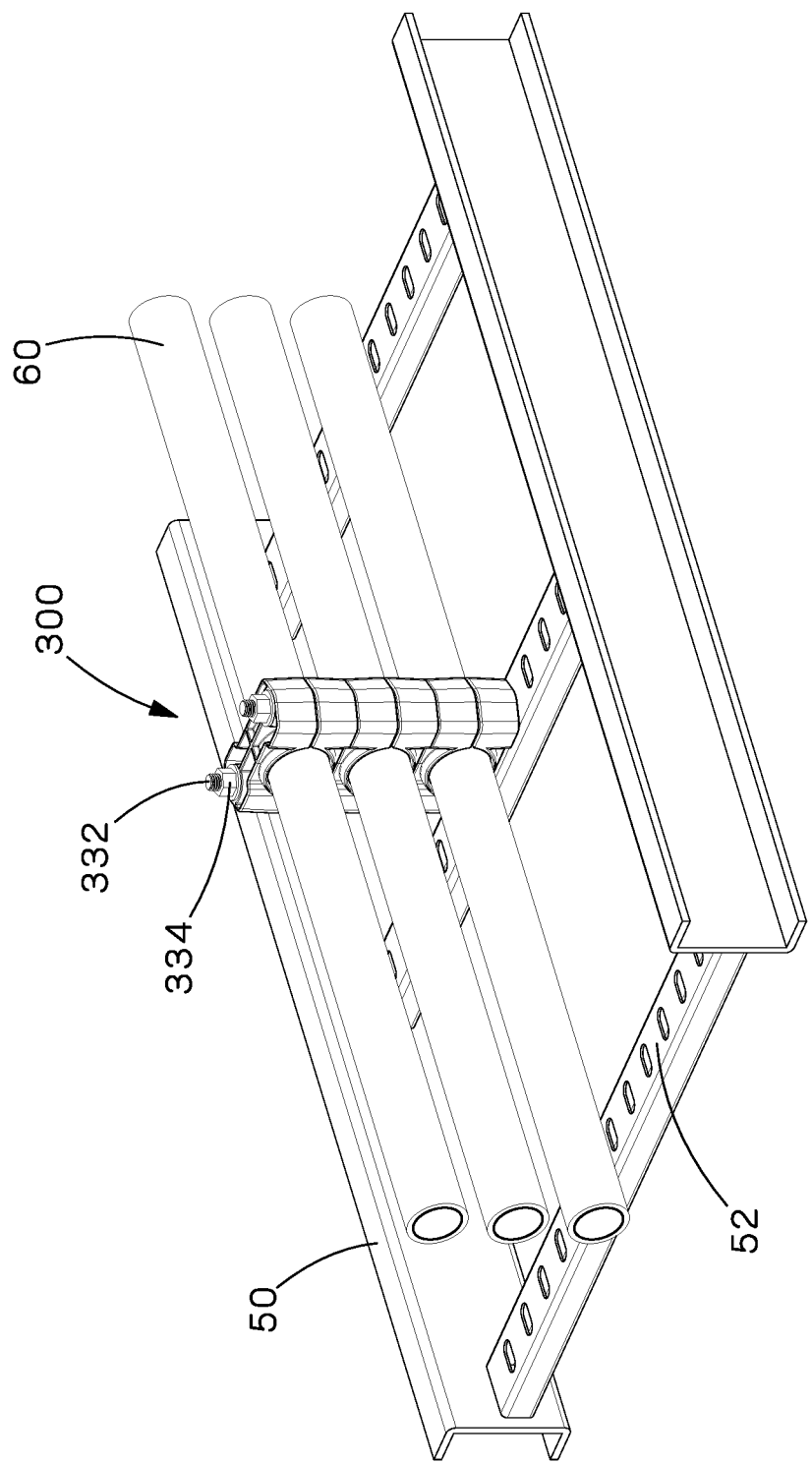
FIG. 35 is a perspective view of a plurality of the two-hole interlocking cable cleat assemblies of FIG. 24 arranged in a stack formation and installed on a ladder rack.
Figure 36:
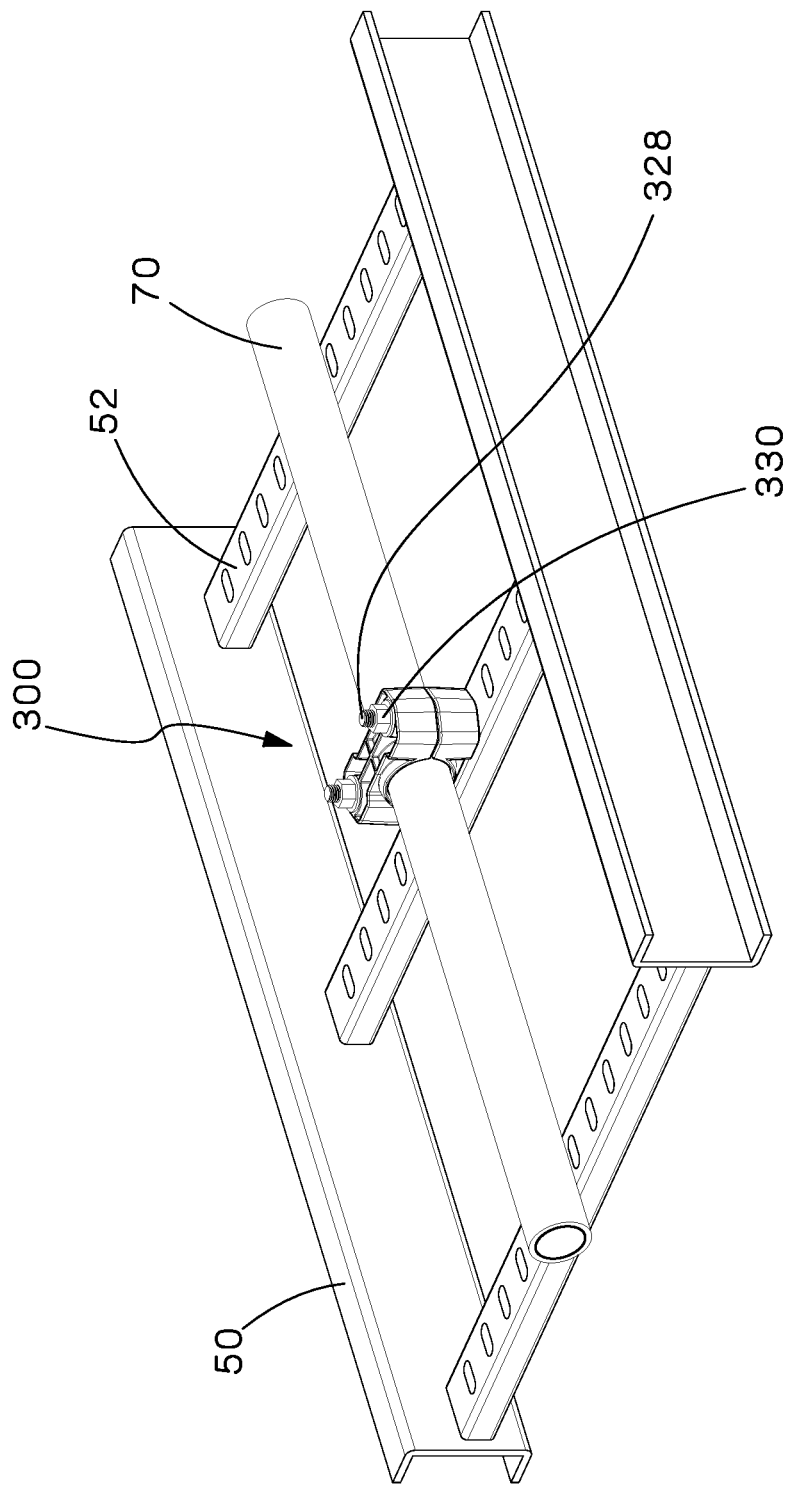
FIG. 36 is a perspective view of the two-hole interlocking cable cleat assembly of FIG. 24 securing a multicore cable installed on a ladder rack.

FIGS. 25, 35, and 36 illustrate various arrangements of the two-hole interlocking cable cleat assembly 300 of the present invention secured to a ladder rung 52. FIG. 25 illustrates the two-hole interlocking cable cleat assemblies 300 arranged in a flat, parallel arrangement. The cable cleat assemblies 300 are secured to the ladder rung 52 using bolts 328 and nuts 330. FIG. 35 illustrates two-hole interlocking cable cleat assembly 300 arranged in a stacked formation. The interlocking cable cleat assemblies 300 are stacked upon one another and are secured to the ladder rung 52 via a threaded rod 332 and nut 334. FIG. 36 illustrates the two-hole interlocking cable cleat assembly 300 securing a multicore cable 70 to a ladder rung 52. The cable cleat assembly 300 is secured to the ladder rung 52 using a bolt 328 and nut 330.

Figure 37:
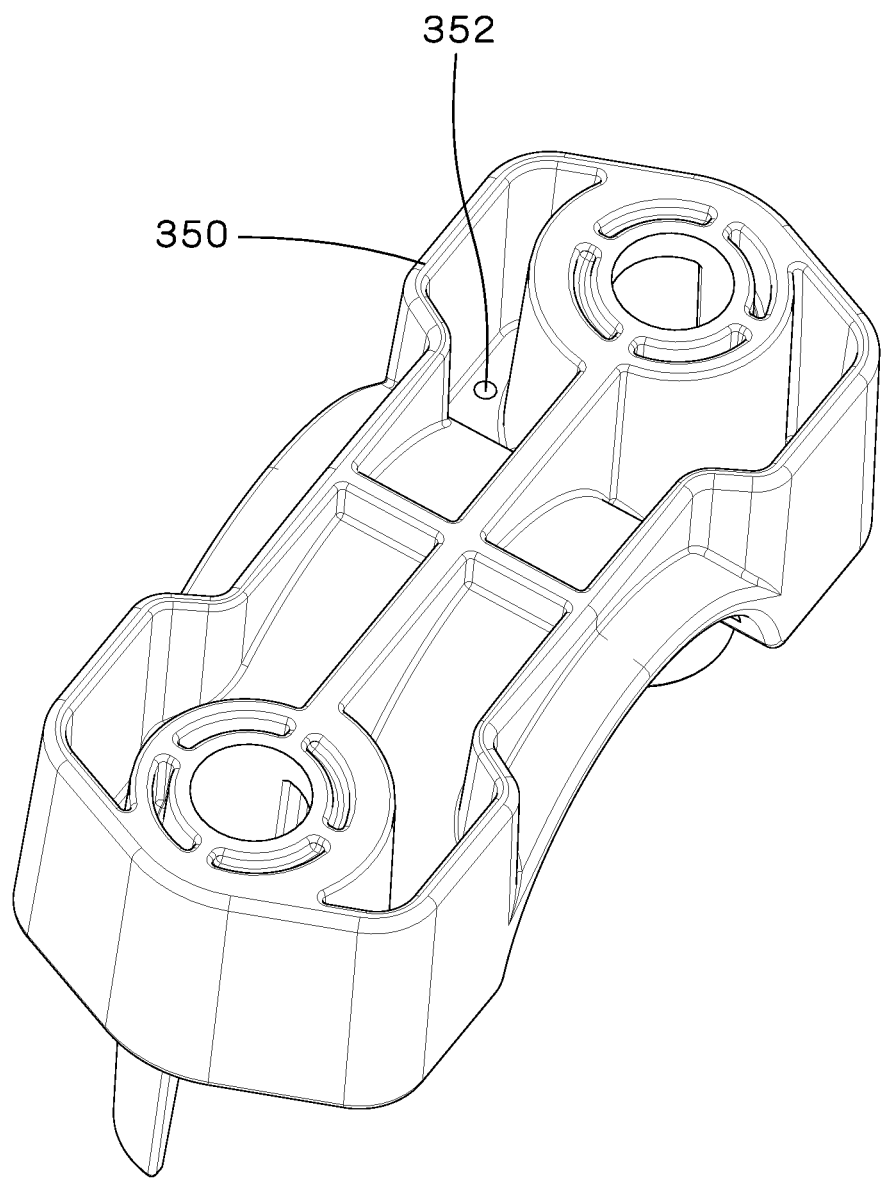
FIG. 37 is a top perspective view of an alternative embodiment of one half of the two-hole interlocking cable cleat of FIG. 29.
Figure 38:
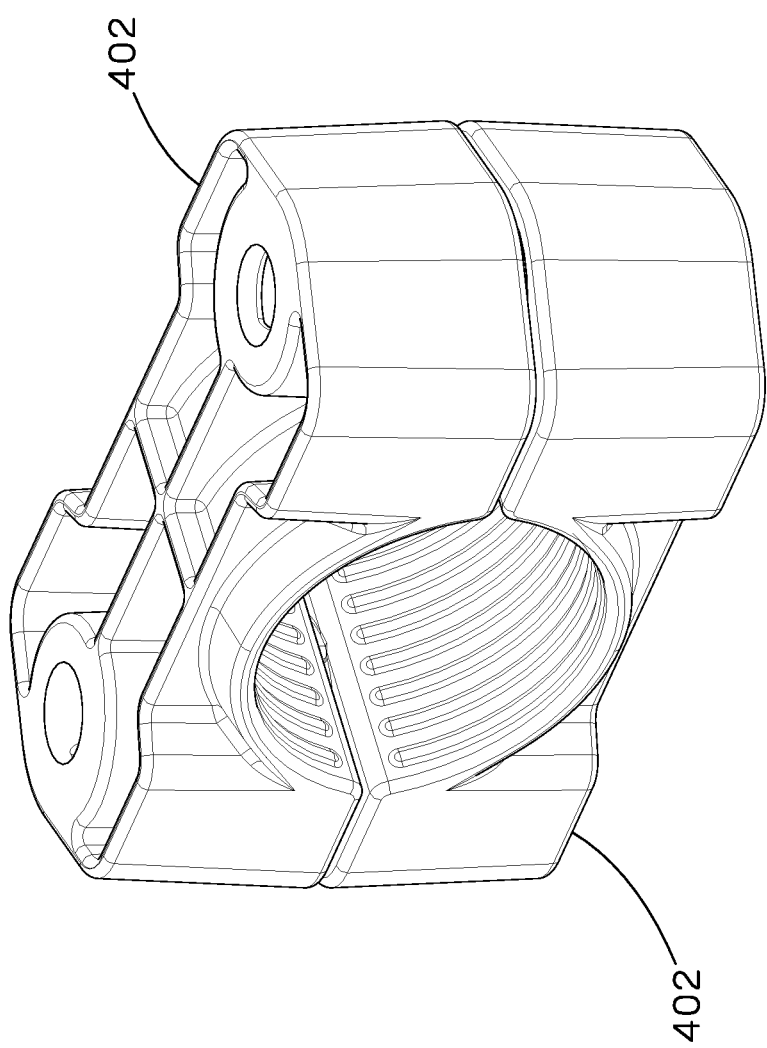
FIG. 38 is a perspective view of an alternative embodiment of the two-hole interlocking cable cleat assembly of the present invention.
Figure 39:
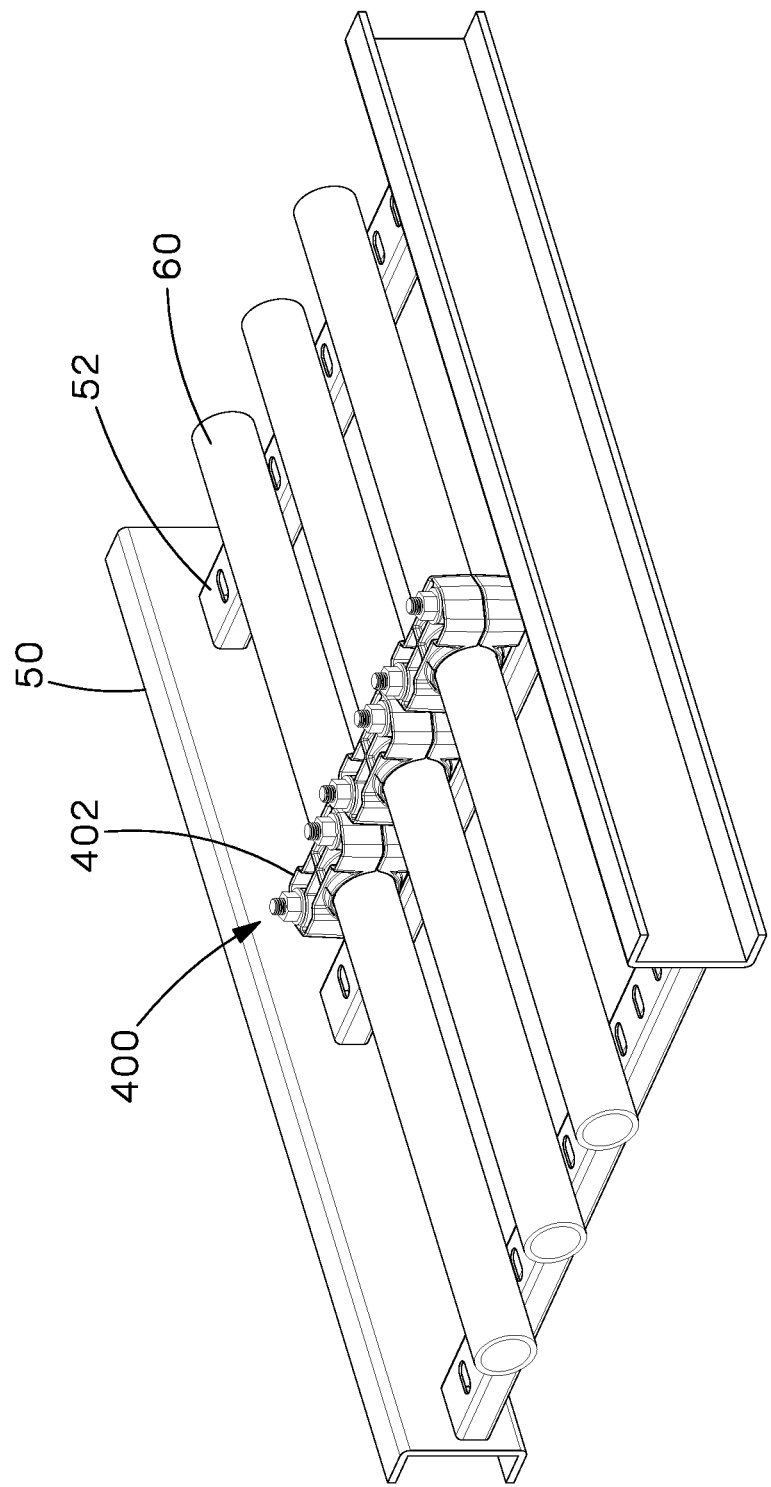
FIG. 39 is a perspective view of a plurality of the two-hole interlocking cable cleat assemblies of FIG. 38 installed on a ladder rack.
Figure 40:
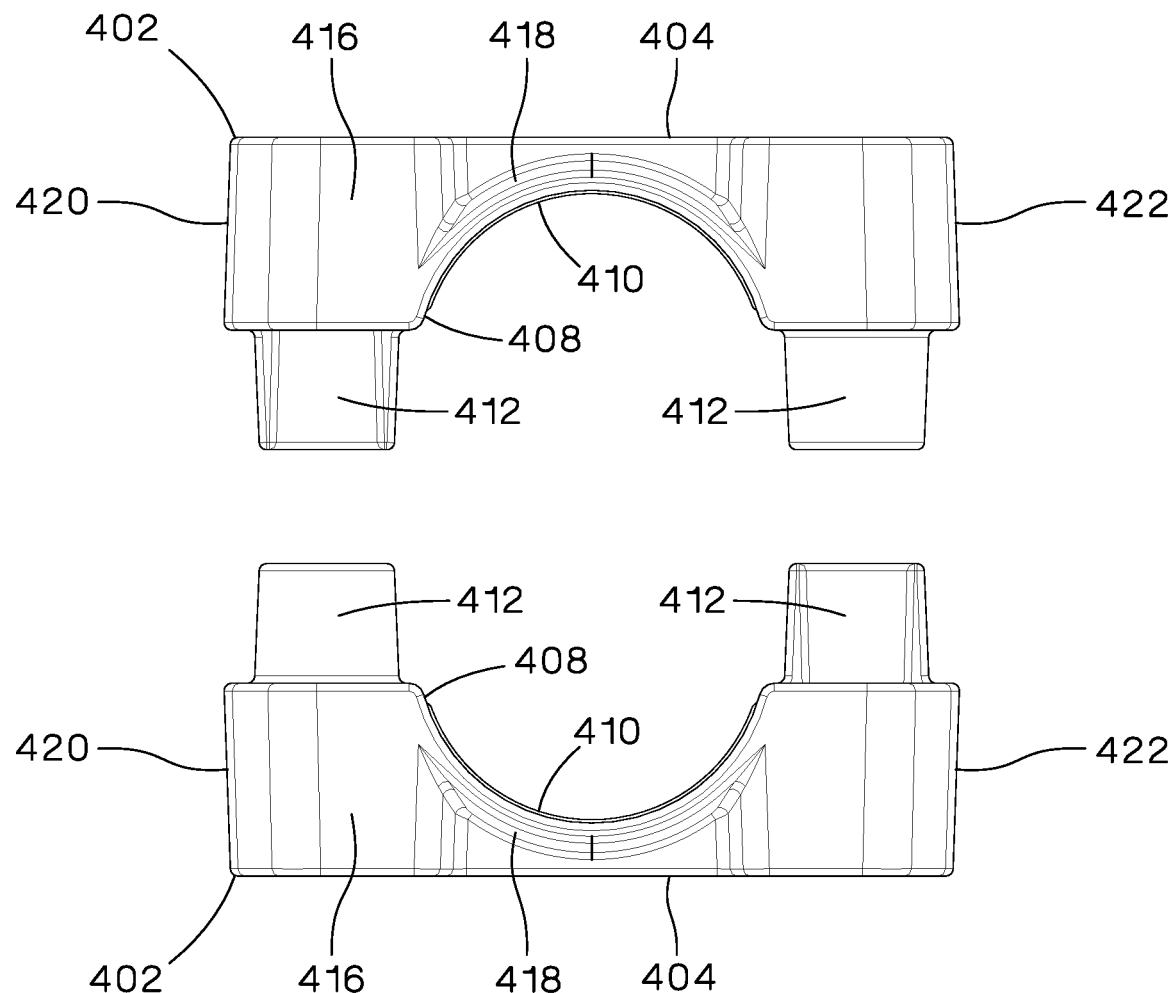
FIG. 40 is a side exploded view of the two-hole interlocking cable cleat of FIG. 38.
Figure 41:
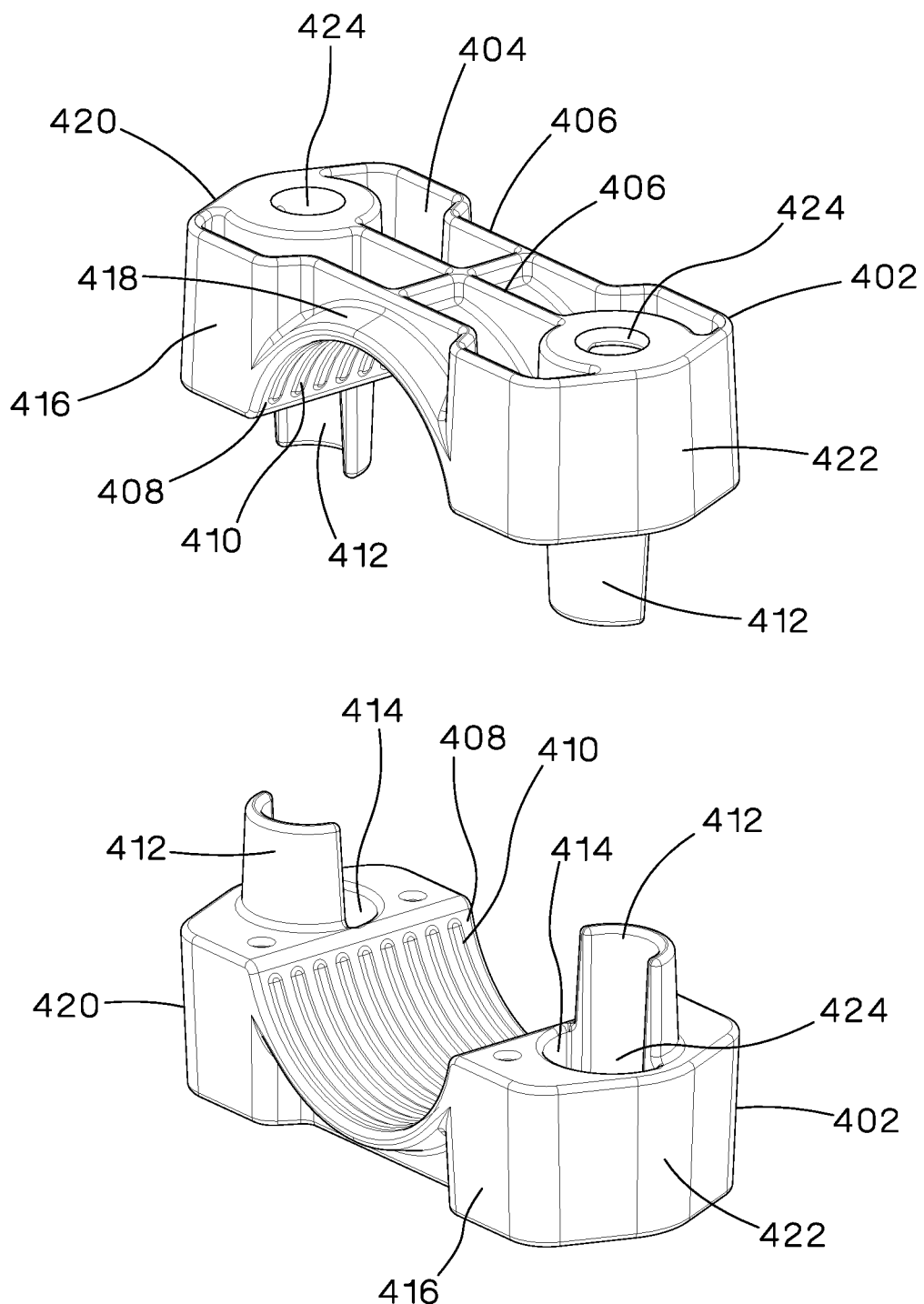
FIG. 41 is an exploded perspective view of the two-hole interlocking cable cleat of FIG. 38.
Figure 42:
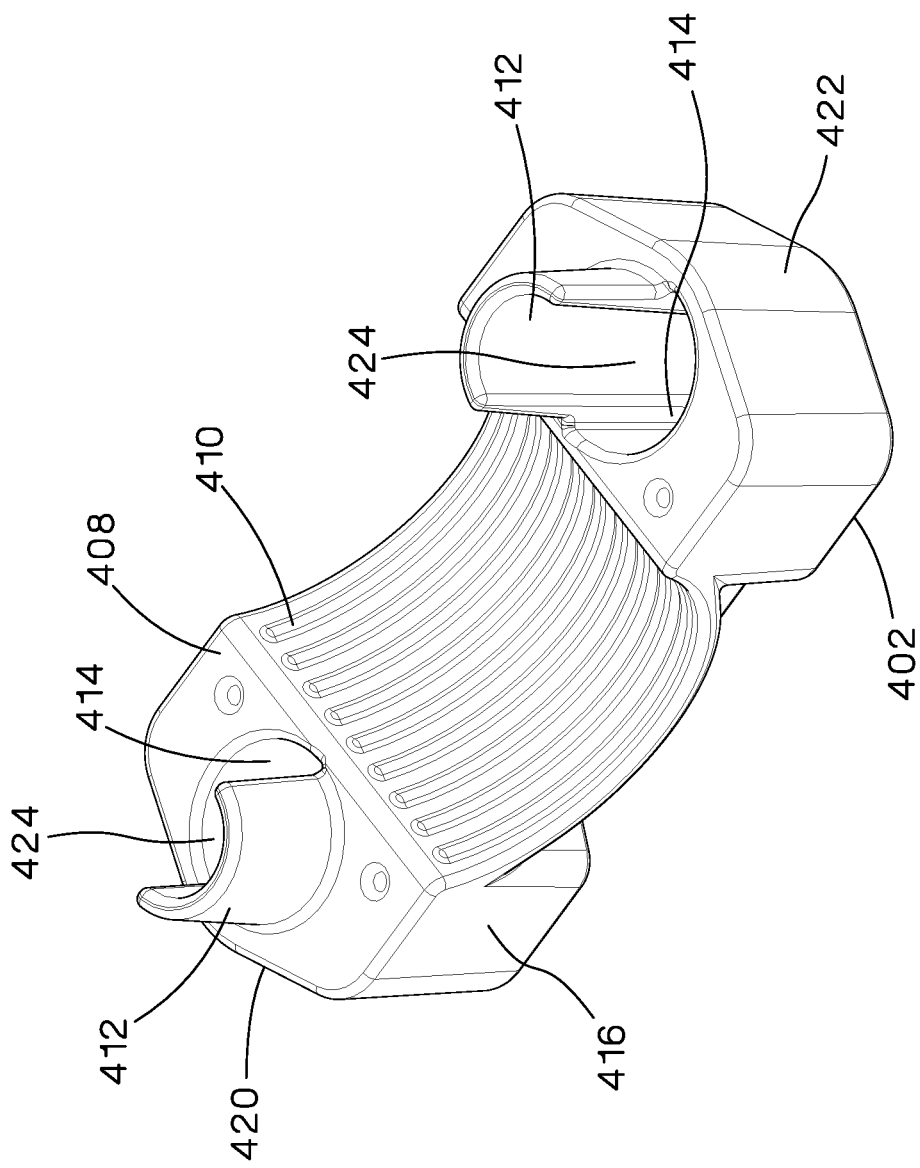
FIG. 42 is a perspective view of one half of the two-hole interlocking cable cleat of FIG. 38.
Figure 43:
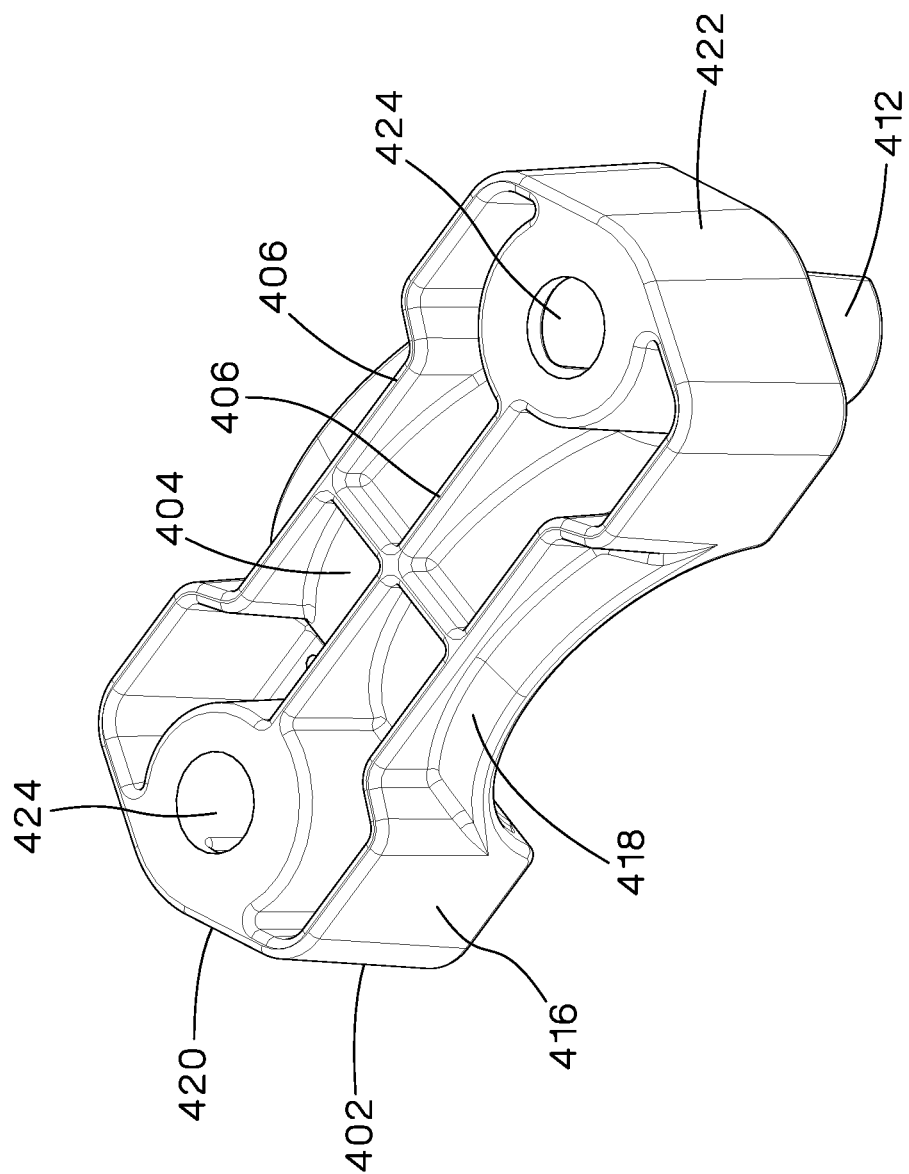
FIG. 43 is a top perspective view of one half of the two-hole interlocking cable cleat of FIG. 38.

As discussed above, water may collect in the recessed areas of the cable cleat assemblies when the interlocking cable cleat halves are installed outdoors. If the water freezes, it could cause the cable cleat half to crack. FIG. 37 illustrates an alternative embodiment of a cable cleat half 350 to prevent water collection. The cable cleat halves 350 could include at least one drain hole 352 to allow water to drain away from the interlocking cable cleat assembly. Drain holes 352 may be placed in all four corners of the cable cleat half 350.

FIGS. 38-43 illustrate an alternative embodiment of the two-hole interlocking cable cleat assembly 400 of the present invention. Each cable cleat half 402 includes an outer surface 404, an inner surface 408, sides 416, a back 420 and a front 422. Each cable cleat half 402 also includes two mounting holes 424 extending from the outer surface 404 to the inner surface 408. The outer surface 404 includes a plurality of strengthening ribs 406 that extend a length of the cable cleat half 402. The outer surface 404 also includes a strengthening rib 406 that extends between the mounting holes 424.

The sides 416 of the cable cleat half 402 form a face 418 for logo or text placement. The face 418 may be angled to improve the visibility of the text. The cable cleat halves 402 also include a wider profile to allow the cable cleat assembly 400 to sit on open ladder rungs.

The inner surface 408 of the cable cleat half 402 includes gripping ribs 410 to engage the cable 60 secured between the cable cleat halves 402. The gripping ribs 410 are aligned and extend along the inner surface 408 of the cable cleat half 402. A semi-circular key 412 extends from the inner surface 408 at each mounting hole 424. The remainder of the mounting hole 424 forms a slot 414 for receiving a key 412 from the opposing cable cleat half 402, as discussed above.

Figure 44:
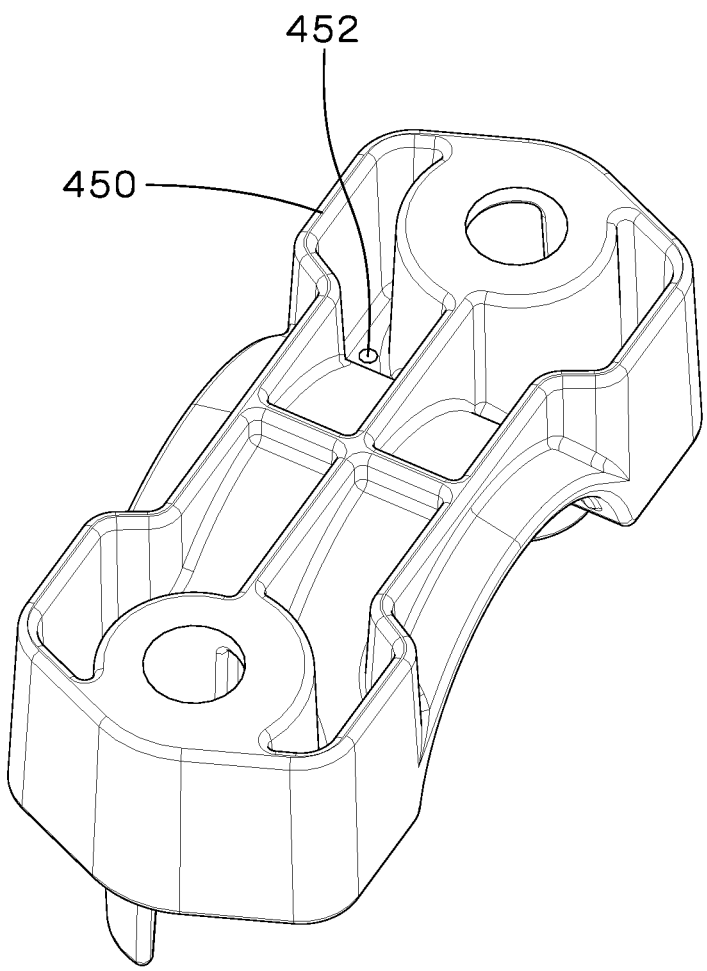
FIG. 44 is a bottom perspective view of an alternative embodiment of one half of the two-hole interlocking cable cleat of FIG. 43.

FIG. 44 illustrates an alternative embodiment of a cable cleat half 450 with at least one drain hole 452 to prevent water collection when using the cable cleat assembly in outdoor arrangements. Drain holes 452 may be placed in all four corners of the cable cleat half 450.

The identical cable cleat halves of the present invention simplify installation of the cable cleat assemblies. The identical cable cleat halves also reduce the cost by reducing the required tooling for the cable cleat assembly. It is contemplated to manufacture the cable cleat halves from various materials; however, the cable cleat halves would typically be manufactured from injection molded plastic or die-cast aluminum.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. An interlocking cable cleat for securing at least one cable to a ladder rack, the interlocking cable cleat comprising:

a first cable cleat half having an outer surface, an inner surface, and at least one mounting hole extending from the outer surface to the inner surface;

a second cable cleat half having an outer surface, an inner surface, and at least one mounting hole extending from the outer surface to the inner surface; and semi-circular keys extending from the inner surface of the first cable cleat half and the inner surface of the second cable cleat half, each semi-circular key is positioned around the at least one mounting hole in the first cable cleat half and the at least one mounting hole in the second cable cleat half defining slots in the remainder of each mounting hole, whereby each slot receives one of the semi-circular keys from an opposing inverted cable cleat half to interlock the first cable cleat half to the second cable cleat half.

2. The interlocking cable cleat of claim 1, wherein the first cable cleat half and the second cable cleat half are identical.

3. The interlocking cable cleat of claim 1, wherein each cable cleat half has a drain hole for enabling collected liquid to drain away from the cable cleat.

4. The interlocking cable cleat of claim 1, wherein the outer surface of the first cable cleat half and the outer surface of the second cable cleat half have ribs for strengthening the cable cleat halves.

5. The interlocking cable cleat of claim 1, wherein the inner surface of the first cable cleat half and the inner surface of the second cable cleat half have a gripping surface for engaging cables secured between the cable cleat halves.

6. The interlocking cable cleat of claim 1, wherein a back of the first cable cleat half has a profile wider than a ladder rung of the ladder rack and a back of the second cable cleat half has a profile wider than the ladder rung of the ladder rack, whereby the profiles allow the interlocking cable cleat to sit on the ladder rung.

7. The interlocking cable cleat of claim 1, wherein a front of the first cable cleat half has a profile wider than a ladder rung of the ladder rack and flared ends and a front of the second cable cleat half has a profile wider than the ladder rung of the ladder rack and flared ends.

8. The interlocking cable cleat of claim 1, wherein the semi-circular keys maintain the first cable cleat half and the second cable cleat half for uniform clamping of the at least one cable.

9. The interlocking cable cleat of claim 1, wherein a fastener extends through the at least one mounting hole of the first cable cleat half and the second cable cleat half for securing the cable cleat halves to each other.

10. The interlocking cable cleat of claim 9, wherein the semi-circular keys surround the fastener to protect the at least one cable from the fastener during a short circuit event.

11. A cable cleat assembly for securing at least one cable to a ladder rack, the cable cleat assembly comprising:

two cable cleat halves, each cable cleat half having an outer surface, an inner surface, and at least one mounting hole extending from the outer surface to the inner surface; wherein a key extends from the inner surface of each cable cleat half, the cable cleat halves are mounted to each other with the inner surface of each cable cleat half facing each other and the keys interlocking the cable cleat halves;

wherein each key is positioned around the at least one mounting hole in the cable cleat halves defining slots in the remainder of the at least one mounting hole, whereby each slot receives one of the keys from an opposing inverted cable cleat half to interlock the cable cleat halves; and a fastener extends through the at least one mounting hole for securing the cable cleat halves to each other.

12. The cable cleat assembly of claim 11, wherein the keys surround the fastener to protect the at least one cable from the fastener during a short circuit event.

13. The cable cleat assembly of claim 11, wherein the cable cleat halves are identical.

14. The cable cleat assembly of claim 11, wherein each cable cleat half having a drain hole for enabling collected liquid to drain away from the cable cleat.

15. The cable cleat assembly of claim 11, wherein the outer surface of each cable cleat half having ribs for strengthening the cable cleat halves.

16. The cable cleat assembly of claim 11, wherein the inner surface of each cable cleat half having a gripping surface for engaging cables secured between the cable cleat halves.

17. The cable cleat assembly of claim 11, wherein a back of each cable cleat half having a profile wider than a ladder rung of the ladder rack, whereby the profile allows the interlocking cable cleat to sit on the ladder rung.

18. The cable cleat assembly of claim 11, wherein a front of each cable cleat half having a profile wider than a ladder rung of the ladder rack and flared ends.

19. The cable cleat assembly of claim 11, wherein the keys maintain the two cable cleat halves for uniform clamping of the at least one cable.

* * * * *